(12) United States Patent
Bowles

(10) Patent No.: US 9,776,488 B2
(45) Date of Patent: Oct. 3, 2017

(54) VEHICLE ROOF AND ROOF OPENING MECHANISM

(71) Applicant: Webasto-Edscha Cabrio GmbH, Stockdorf (DE)

(72) Inventor: Jason Bowles, Owosso, MI (US)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 15/145,394

(22) Filed: May 3, 2016

(65) Prior Publication Data

US 2016/0263976 A1    Sep. 15, 2016

Related U.S. Application Data

(63) Continuation-in-part of application No. 14/642,976, filed on Mar. 10, 2015, now Pat. No. 9,346,342.

(51) Int. Cl.
*B60J 7/12* (2006.01)
*B60J 7/11* (2006.01)

(52) U.S. Cl.
CPC .............. *B60J 7/1291* (2013.01); *B60J 7/11* (2013.01)

(58) Field of Classification Search
CPC .................................. B60J 7/11; B60J 7/1291
USPC ..................... 296/216.01, 214, 219
See application file for complete search history.

(56) References Cited

U.S. PATENT DOCUMENTS

| | | | |
|---|---|---|---|
| 1,374,627 A | 4/1921 | Allen | |
| 1,533,148 A | 4/1925 | Tomkins et al. | |
| 4,012,807 A * | 3/1977 | Kern | E05D 3/16 16/288 |
| 4,728,146 A * | 3/1988 | Srdinko | B60R 13/0206 296/216.06 |
| 5,018,783 A | 5/1991 | Chamings et al. | |
| 5,106,151 A * | 4/1992 | Nishikawa | B60J 7/1858 296/219 |
| 5,267,774 A | 12/1993 | Garner et al. | |
| 7,523,977 B2 | 4/2009 | Fallis, III et al. | |
| 7,527,328 B2 | 5/2009 | Reitzloff et al. | |
| 8,186,740 B2 | 5/2012 | Huotari et al. | |
| 9,139,073 B2 | 9/2015 | Hamberkamp et al. | |
| 9,539,888 B2 * | 1/2017 | Haberkamp | B60J 7/1291 |
| 2005/0134096 A1 | 6/2005 | Fallis, III et al. | |
| 2009/0033128 A1* | 2/2009 | Hoelzel | B60J 7/022 296/216.01 |
| 2012/0098292 A1 | 4/2012 | Huotari et al. | |
| 2014/0300143 A1 | 10/2014 | Haberkamp et al. | |

FOREIGN PATENT DOCUMENTS

| | | |
|---|---|---|
| BE | 350 963 | 5/1928 |
| DE | 464 440 C | 8/1928 |
| DE | 3939524 | 6/1990 |
| DE | 10 2006 006 686 A1 | 8/2007 |

* cited by examiner

*Primary Examiner* — Dennis H Pedder
(74) *Attorney, Agent, or Firm* — Fitch, Even, Tabin & Flannery, LLP

(57) ABSTRACT

A vehicle roof having a roof structure with a roof opening, which, by a roof opening mechanism, can be closed or at least partially uncovered as desired, said roof opening mechanism being designed as an interchangeable insert. Additionally, a roof opening mechanism is proposed, being designed as an interchangeable insert, for unlockable fixation at a roof structure of a vehicle roof, and comprising a frame, which can be placed upon an edge region of the roof structure, said edge region limiting a roof opening.

20 Claims, 33 Drawing Sheets

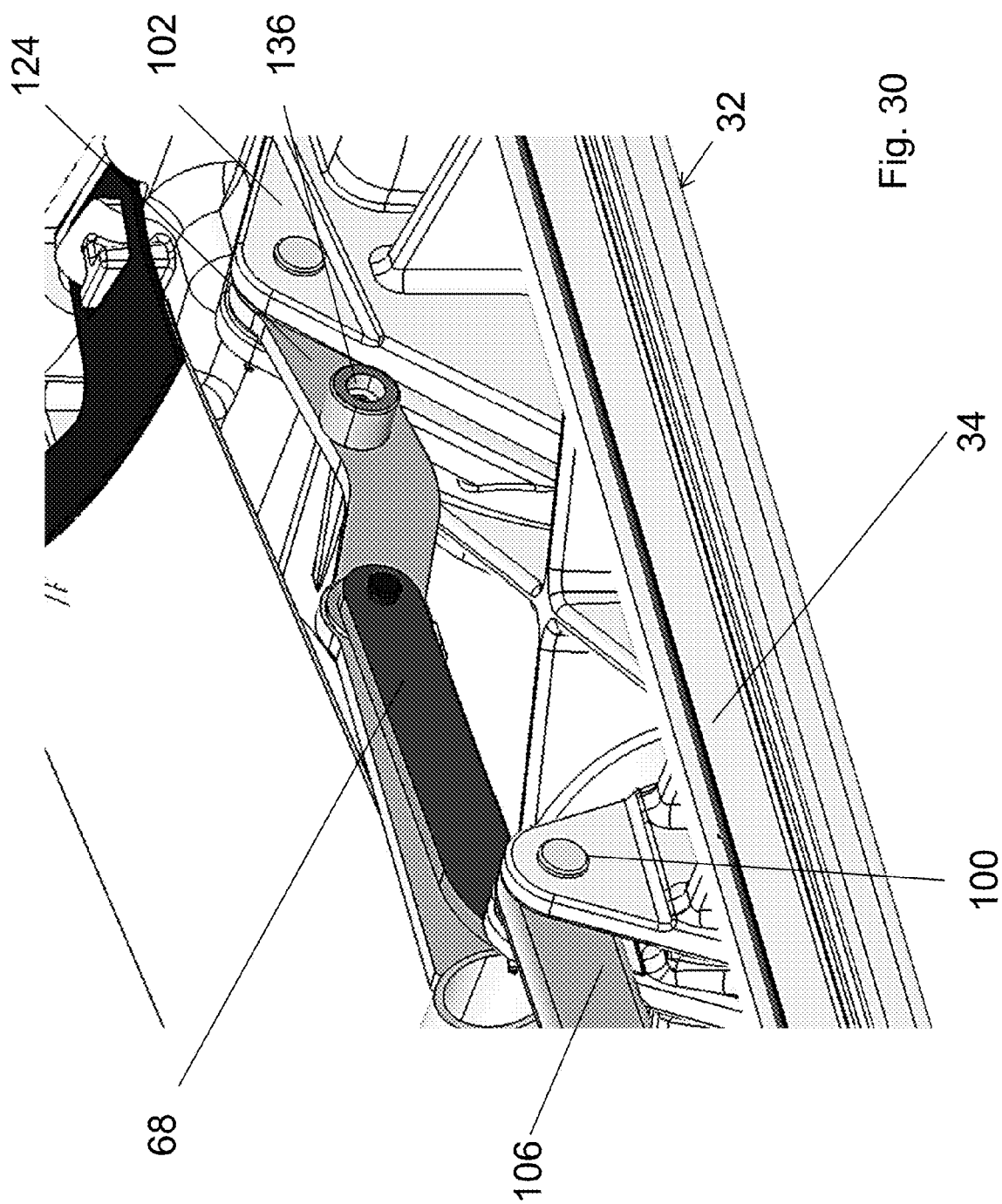

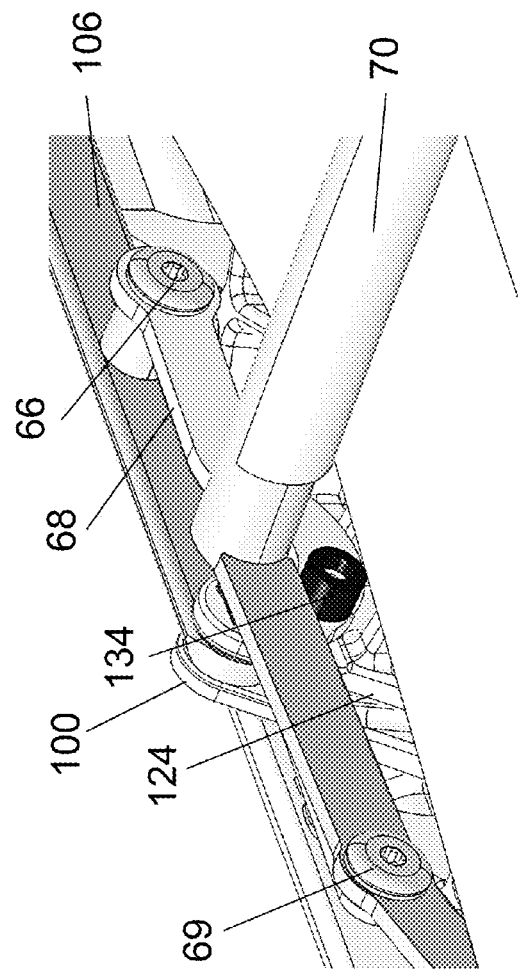
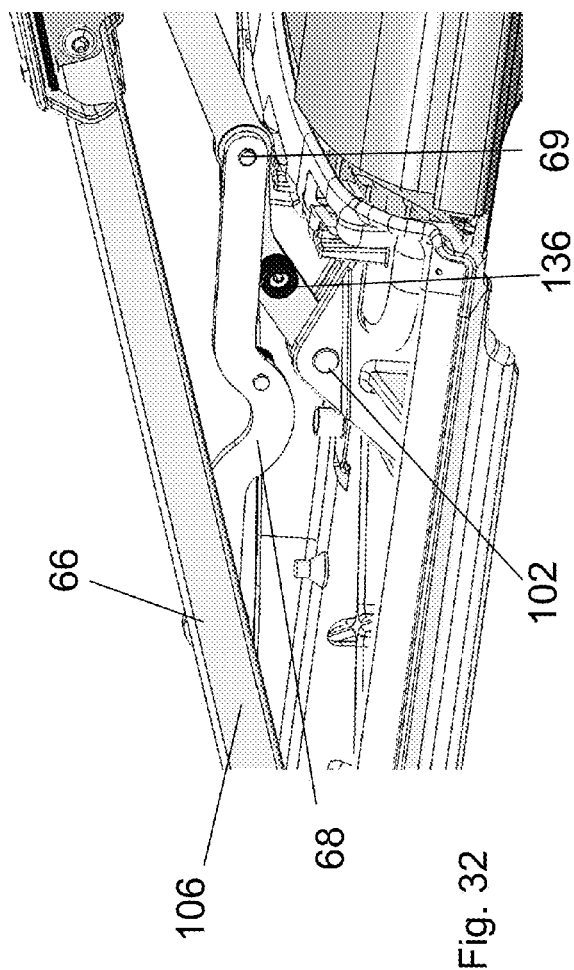

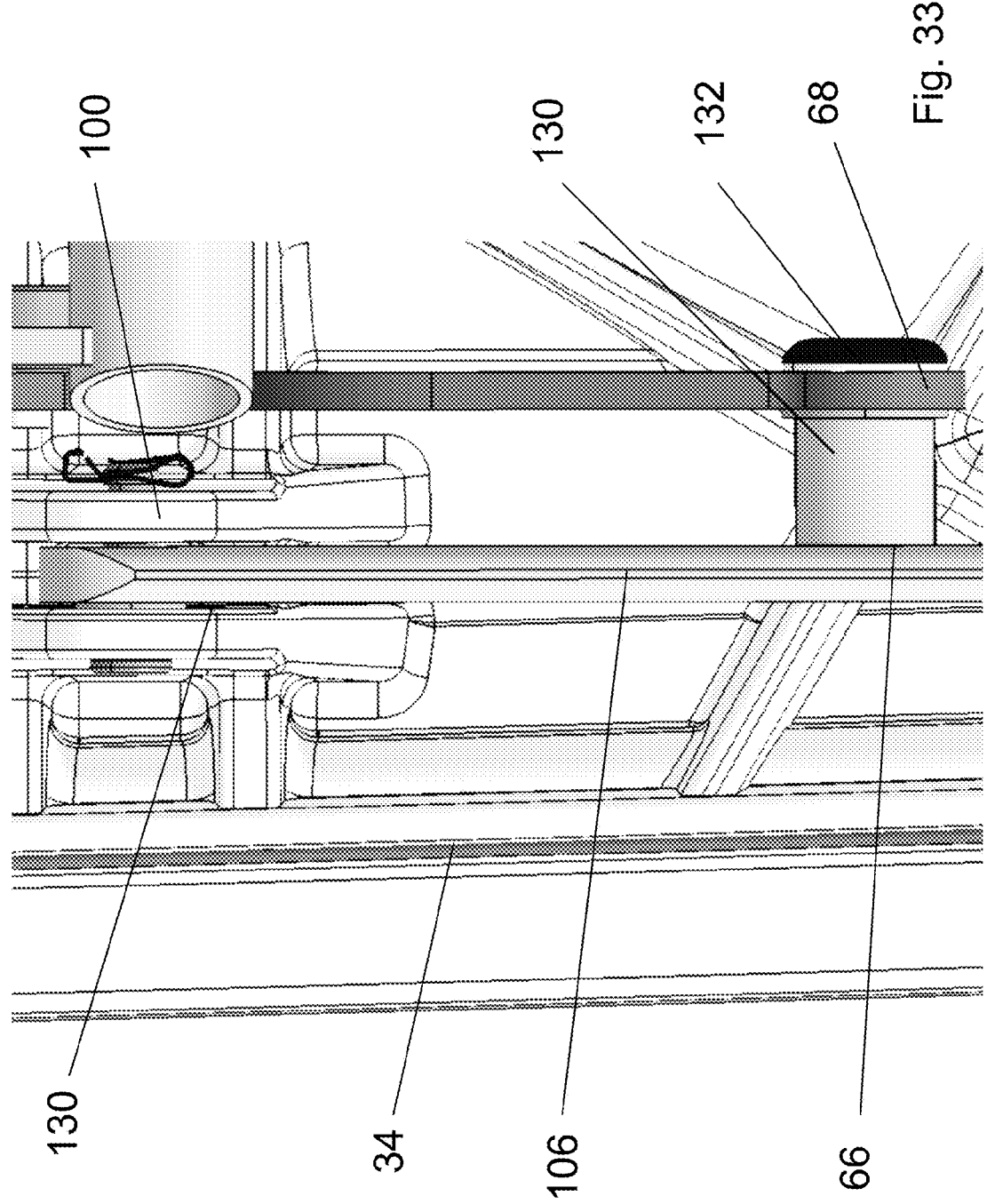

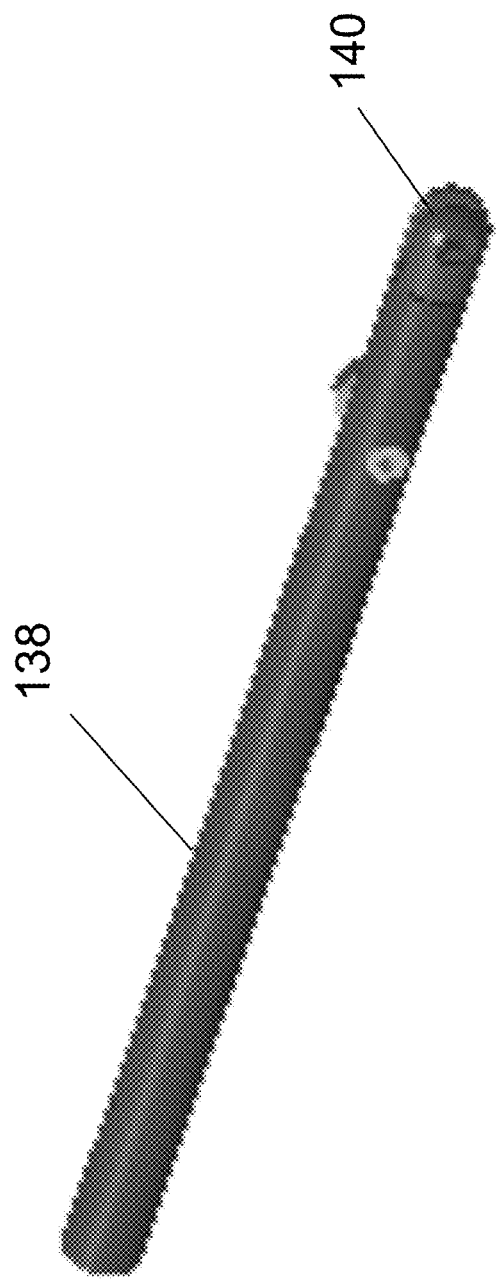

VEHICLE ROOF AND ROOF OPENING MECHANISM

CROSS-REFERENCE TO RELATED APPLICATIONS

This application is a continuation-in-part of U.S. application Ser. No. 14/642,976, filed Mar. 10, 2015, the content of which is hereby incorporated herein by reference in its entirety for all purposes.

TECHNICAL FIELD

This disclosure relates to a vehicle roof having a roof structure with a roof opening, and in particular a vehicle roof structure having a roof opening mechanism configured as an interchangeable insert, which can be closed or at least partially uncovered as desired.

BACKGROUND

Motor vehicles having vehicle roofs of the above-described type are known from practice and are for example designed as an off-road vehicle or SUV (Sports Utility Vehicle). The vehicle roof, which is usually a fixed-roof, includes a roof opening above a driver's seat and a front passenger seat, which roof opening can be closed or at least partially uncovered by a sliding roof arrangement. The sliding roof arrangement is integrated into the roof structure in a permanent fashion and has drive kinematics, which are guided in guide rails being arranged on both sides of the roof opening. The drive kinematics usually have a complex heavy structure, which is reflected in the overall costs of the vehicle roof and of the relevant motor vehicle.

SUMMARY

Vehicle roofs are described whose roof opening can be used as desired by the user.

Therefore, a vehicle roof is proposed having a roof structure with a roof opening having a roof opening mechanism which can be closed or at least partially uncovered as desired, said roof opening mechanism being designed as an interchangeable insert. wherein the interchangeable insert comprises a base frame, which follows an edge of the roof opening, wherein the roof opening mechanism further comprises a fabric covering element, which, by at least one tensioning bow pivotable with respect to the base frame, is displaceable between a closed position for covering the roof opening and an uncovering position for uncovering the roof opening.

According to one approach, the roof opening mechanism in the proposed vehicle roof can be installed or removed by a user of the relevant vehicle if required or desired. Manipulation of the roof structure itself, onto which the interchangeable insert can be placed, is not required hereunto. Instead, the proposed vehicle roof can be a variable system in which the roof opening can either be provided with a roof opening mechanism or, alternatively, with a rigid element, or in which the roof opening can also be left completely open. A rigid roof element, which is designed in one piece or in several pieces, can be fixed to the roof structure via the same links as the roof opening mechanism being designed as an interchangeable insert.

The interchangeable insert is provided with a base frame, which follows an edge of the roof opening. The base frame constitutes the element of the interchangeable insert that serves for linking the roof opening mechanism to the roof structure. This means that the base frame forms a link between the roof opening mechanism and the roof structure or vehicle structure. In principle, the base frame can be realized as a closed frame preferably having four legs or also as an open frame, for example having three legs, e.g., it can have a roughly "U"-shaped layout.

In order to make it as easy as possible for users of the relevant vehicle to install the roof opening mechanism at the roof structure or to remove the roof opening mechanism from the roof structure, the base frame is preferably attached to the roof structure via fixation elements being manually unlockable. For example, the manually unlockable fixation elements are handle screws, which reach through the roof structure from below. Preferably, in the region of lateral roof beams, two handle screws in each instance reach through the roof structure from below, in order to reach into corresponding screw threads of the base frame from below, said base frame being arranged on the roof structure.

The roof opening mechanism comprises a fabric covering element, which, by at least one tensioning bow pivotable with respect to the base frame, is displaceable between a closed position for covering the roof opening and an uncovering position for uncovering the roof opening. This means that the tensioning bow constitutes the control element of the roof opening mechanism that is then designed in the manner of a folding roof. The position of the tensioning bow prescribes the position and the tensioning state of the fabric covering element.

The tensioning bow is in particular mounted at the base frame of the interchangeable insert, to be more precise, in relation to a longitudinal center plane of the roof, it is preferably on each of its two sides mounted via a tensioning bow portion being articulated to a corresponding leg of the base frame.

In order to be able to secure the fabric covering element in its closed position, in a special embodiment, the tensioning bow, in the closed position, is adjacent to a front edge of the roof opening in order to be secured at the roof structure by a closing mechanism. The roof structure also comprises a front apron of the relevant vehicle, which forms an upper frame leg of a windshield frame of the relevant motor vehicle.

In order to be able to fold the fabric covering element in a controlled fashion in the uncovering position, the tensioning bow, in a special embodiment, is coupled to a pivotable auxiliary tensioning bow. The auxiliary tensioning bow can be fixed to the fabric covering element or can also only loosely abut on the fabric covering element from below, or it can also reach into a pocket of the fabric covering element.

In order to be able to move the tensioning bow and the auxiliary tensioning bow when they are coupled, the tensioning bow, in a preferred embodiment, in relation to a vertical longitudinal center plane of the roof, is on each of its two sides connected to the auxiliary tensioning bow via a coupling rod.

In accordance with a further aspect of the present disclosure, a roof opening mechanism is proposed, being designed as an interchangeable insert, for unlockable fixation at a roof structure of a vehicle roof, and comprising a frame, which can be placed onto an edge region of the roof structure, said edge region limiting a roof opening. The roof opening mechanism can present the features that have previously been described in conjunction with the vehicle roof.

The frame of the roof opening mechanism can be designed so as to be closed or it can also have only three legs, via which it can be linked to the roof structure, i.e. it can have a U-shaped layout in the broadest sense.

According to a further aspect of the present disclosure, a vehicle roof is proposed, comprising a roof structure having a roof opening, which, as desired, can be provided with a roof opening mechanism, which is designed as an interchangeable insert of the previously described type, or with a rigid roof element being designed in one part or in several parts.

Further advantages and advantageous configurations of the subject-matter of the invention can be taken from the description, from the drawing and from the claims.

BRIEF DESCRIPTION OF THE DRAWING

In the drawing, a motor vehicle having a vehicle roof, including a roof opening, is illustrated in a schematically simplified fashion and will be explained in more detail in the following description.

FIG. 30 shows a perspective illustration of how the main tensioning bow and an auxiliary tensioning bow are linked to the base frame.

FIG. 31 shows a detail illustration of the main tensioning bow and of the auxiliary tensioning bow and their stops in the closed position of the roof opening mechanism.

FIG. 32 shows a detail illustration of the main tensioning bow and of the auxiliary tensioning bow and their stops in the open position of the roof opening mechanism.

FIG. 33 shows a detail top view of the base frame in the area where it is linked to the main auxiliary bow.

FIG. 34 shows a special embodiment of a linkage of the main tensioning bow.

DETAILED DESCRIPTION OF PREFERRED EMBODIMENTS

Figure 1:
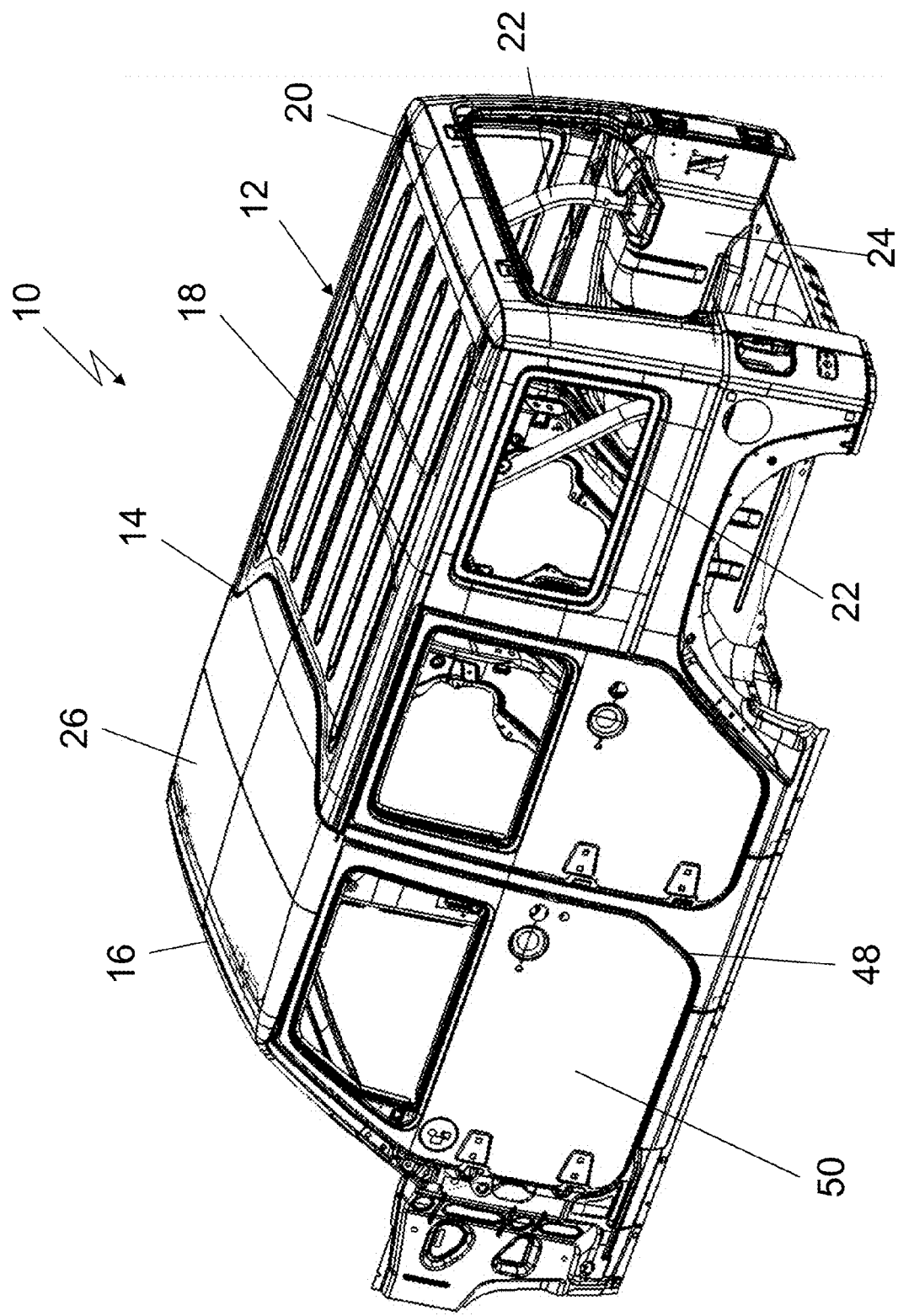
FIG. 1 shows a perspective view of a vehicle structure having a roof opening, which is closed by a rigid element.
Figure 2:
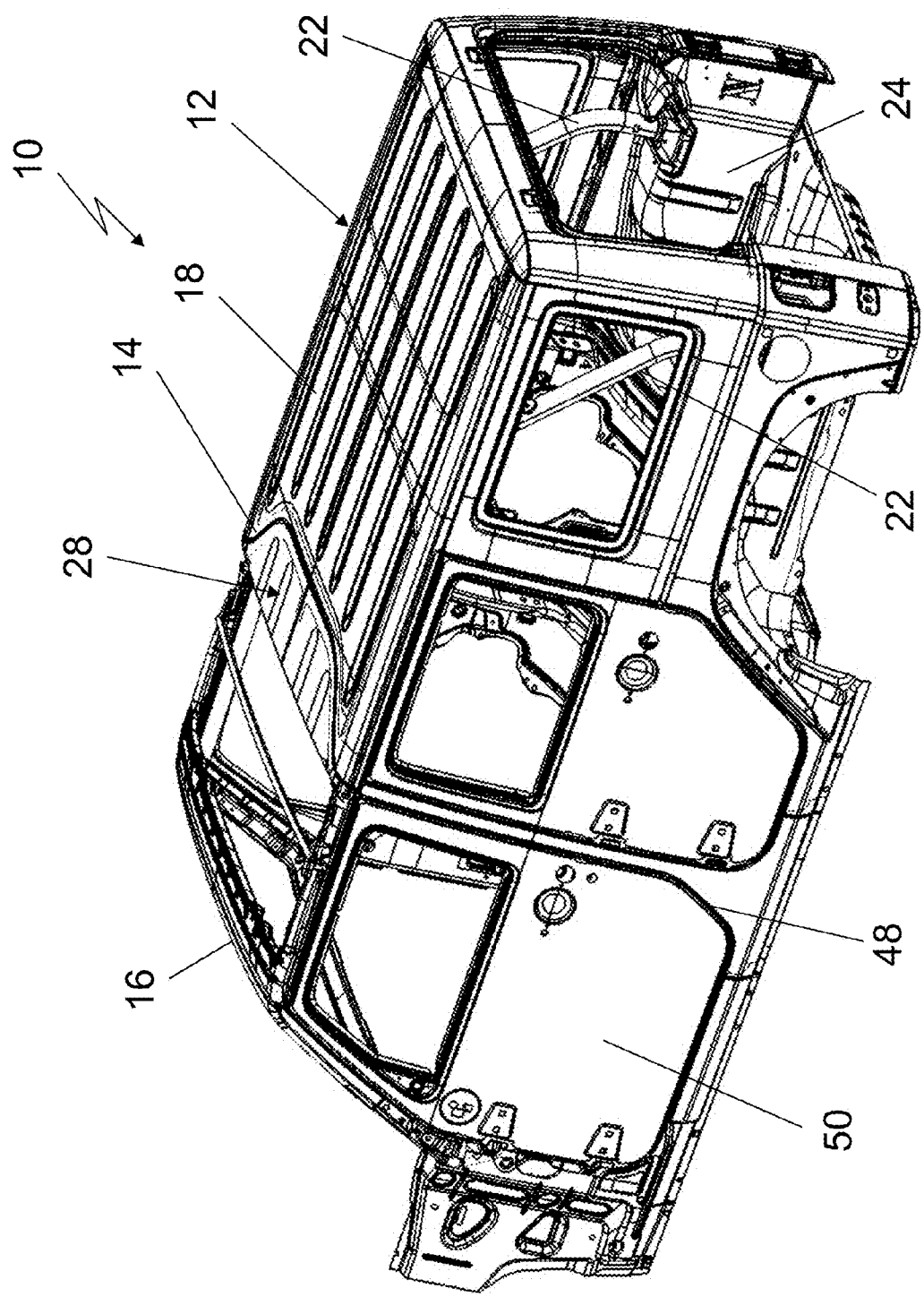
FIG. 2 shows a view that is similar to FIG. 1, but with a roof opening mechanism in the closed position thereof.
Figure 3:
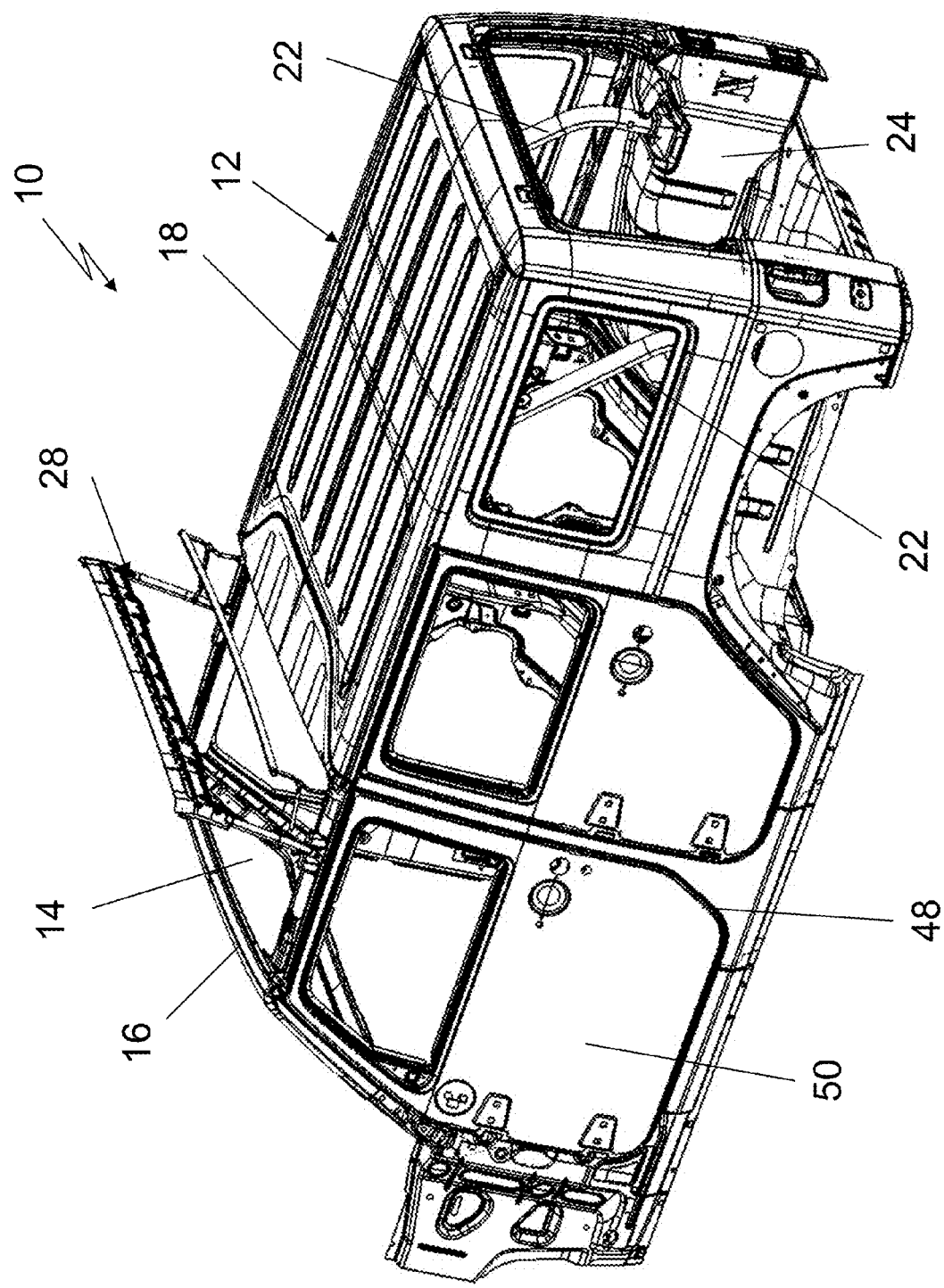
FIG. 3 shows a view that is similar to FIG. 2, but in an intermediate position of the roof opening mechanism.
Figure 4:
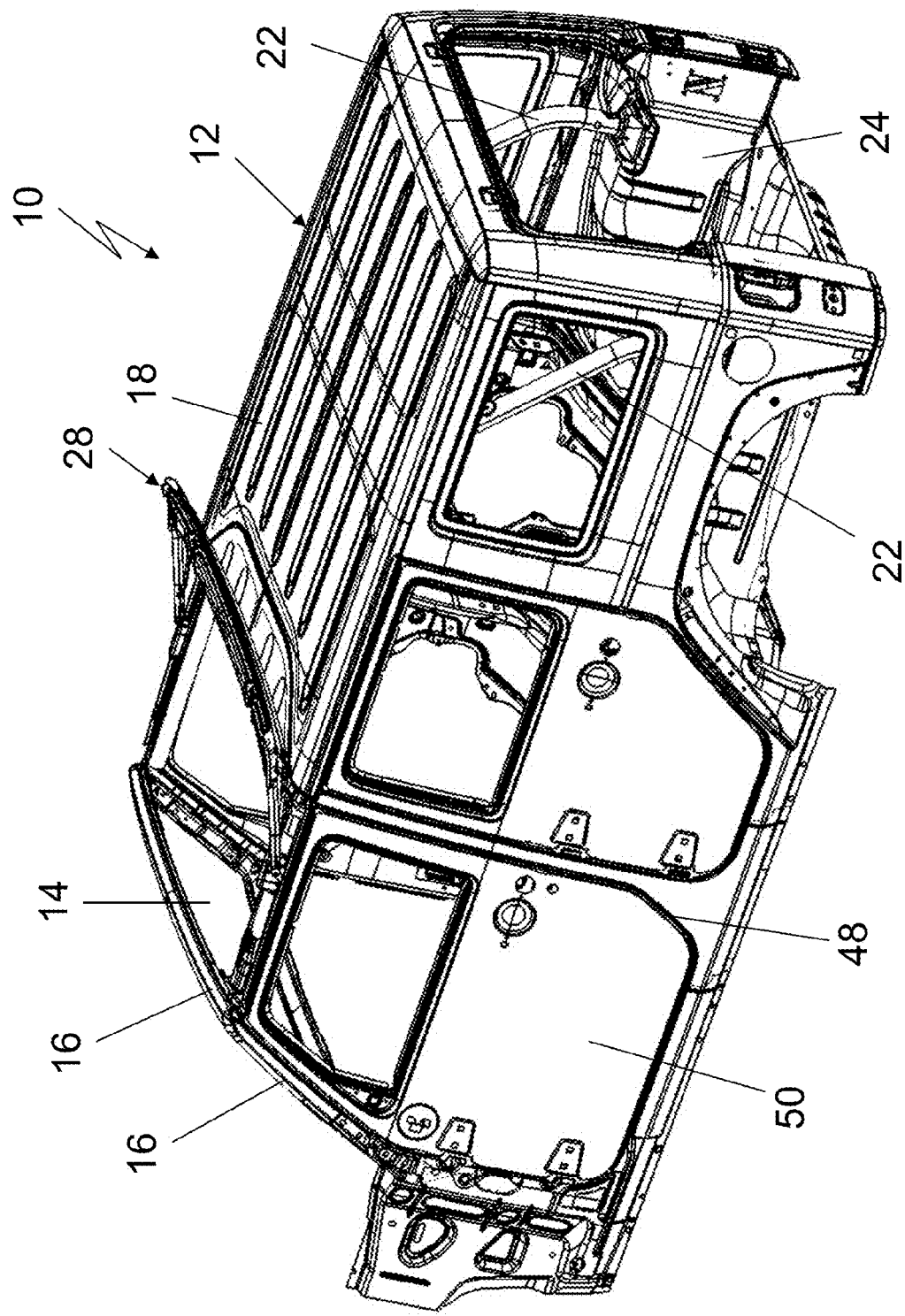
FIG. 4 equally shows a view that is similar to FIG. 2, but in an open position of the roof opening mechanism.
Figure 5:
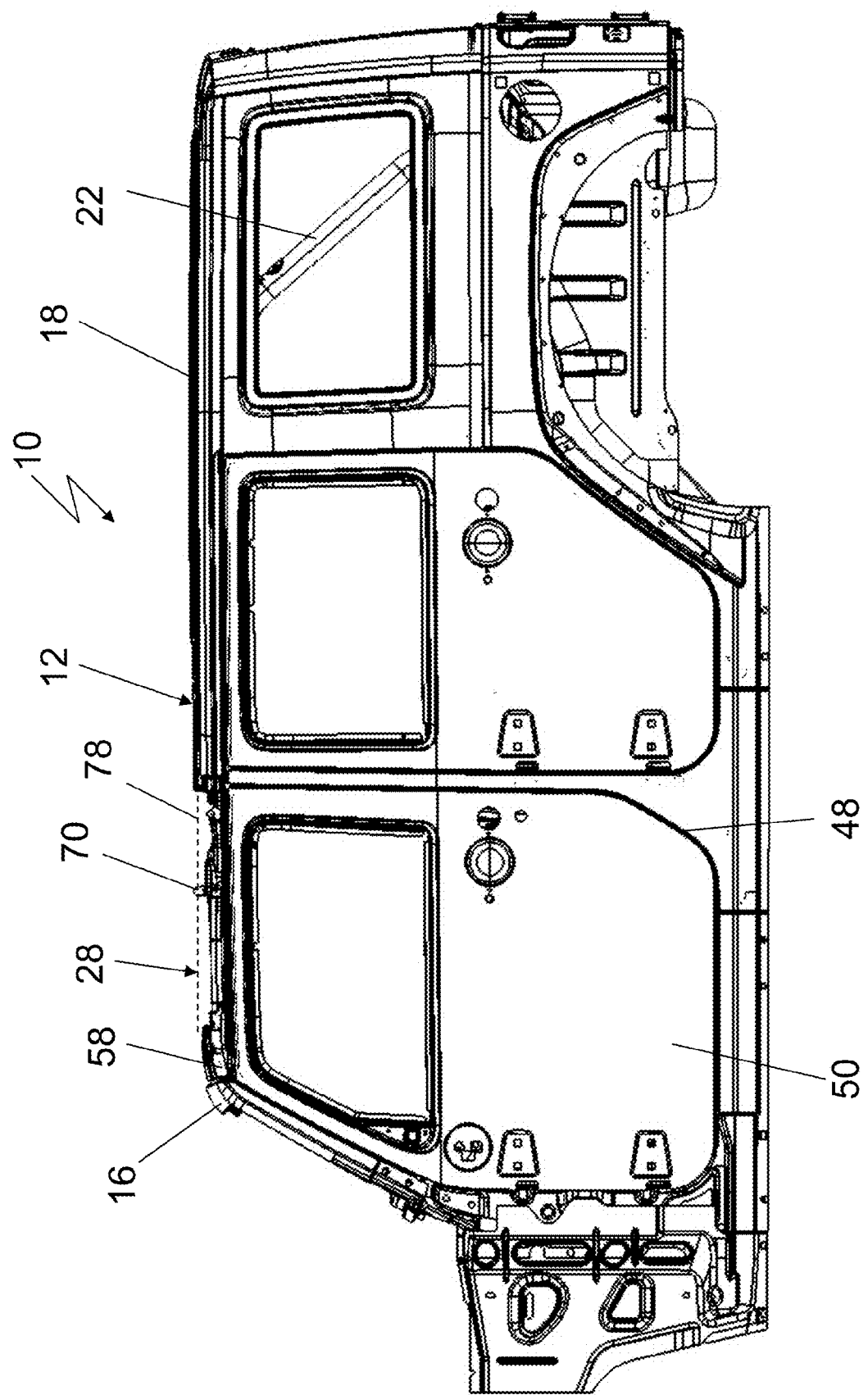
FIG. 5 shows a side view of the vehicle structure with the roof opening mechanism in the closed position thereof.
Figure 6:
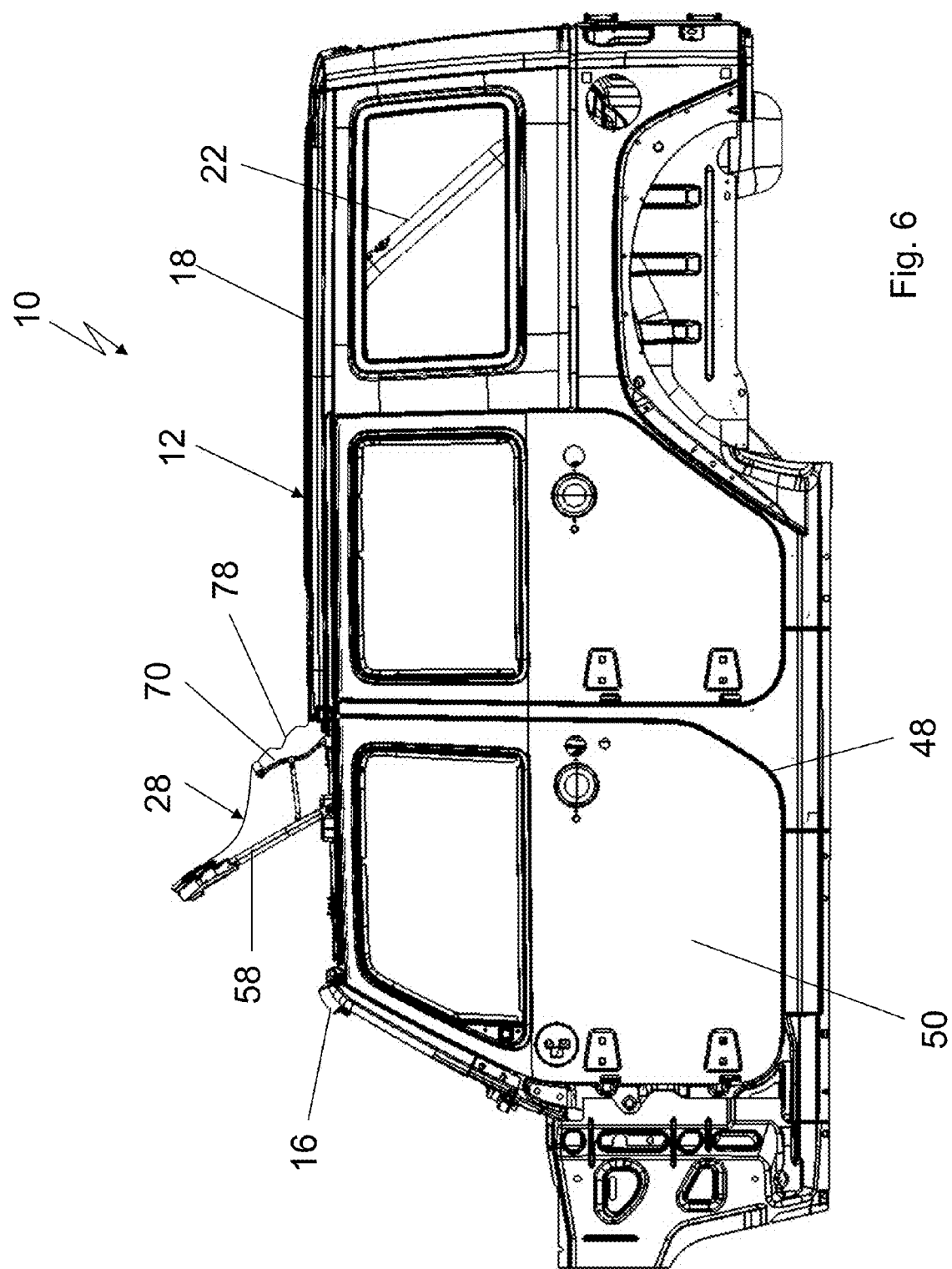
FIG. 6 shows a view that is similar to FIG. 5, but in the intermediate position of the roof opening mechanism.
Figure 7:
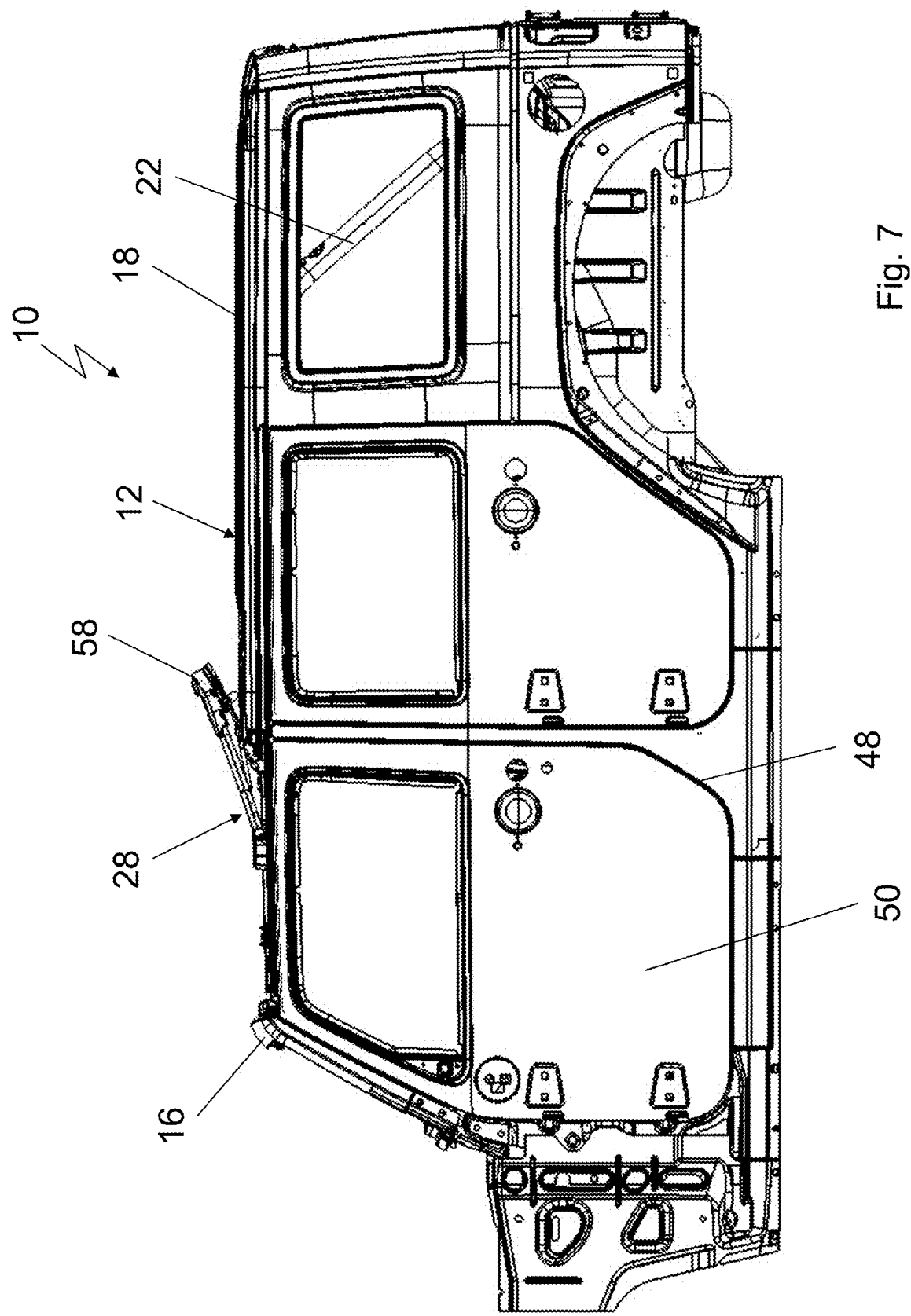
FIG. 7 shows a view that is similar to FIG. 5, but in the open position of the roof opening mechanism.
Figure 8:
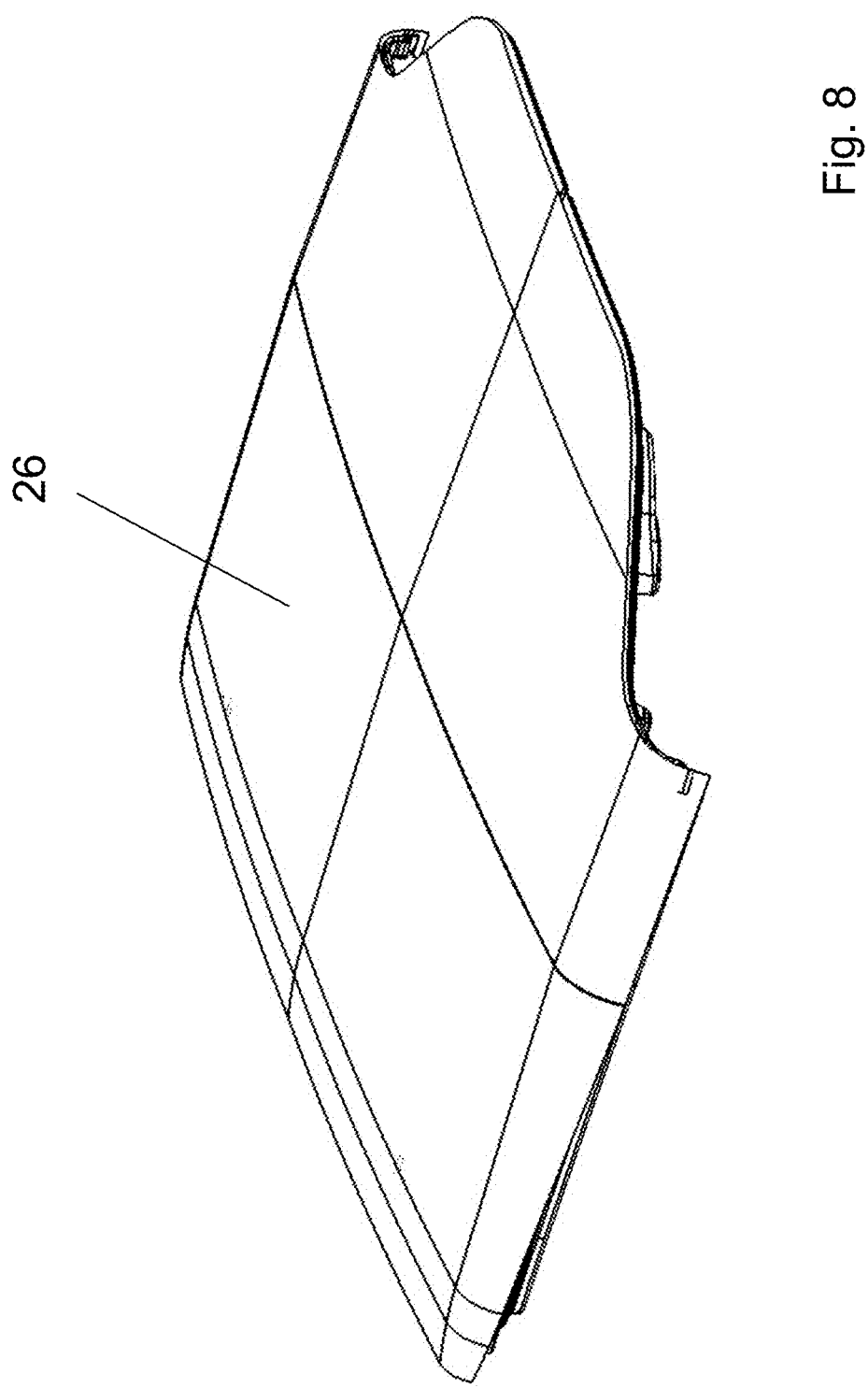
FIG. 8 shows the rigid element according to FIG. 1 on its own.
Figure 9:
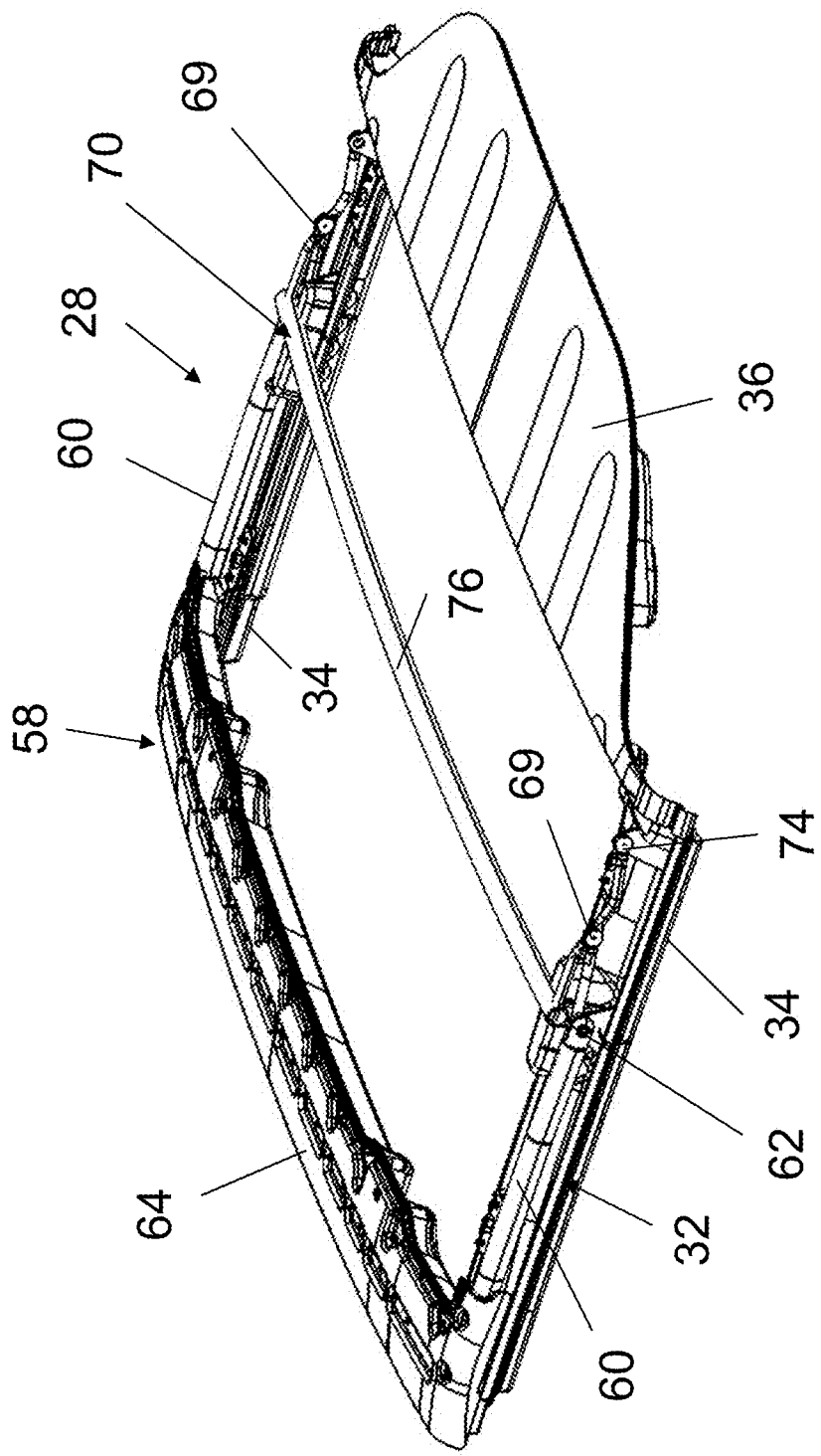
FIG. 9 shows a perspective top view onto the roof opening mechanism on its own, in the closed position thereof.
Figure 10:
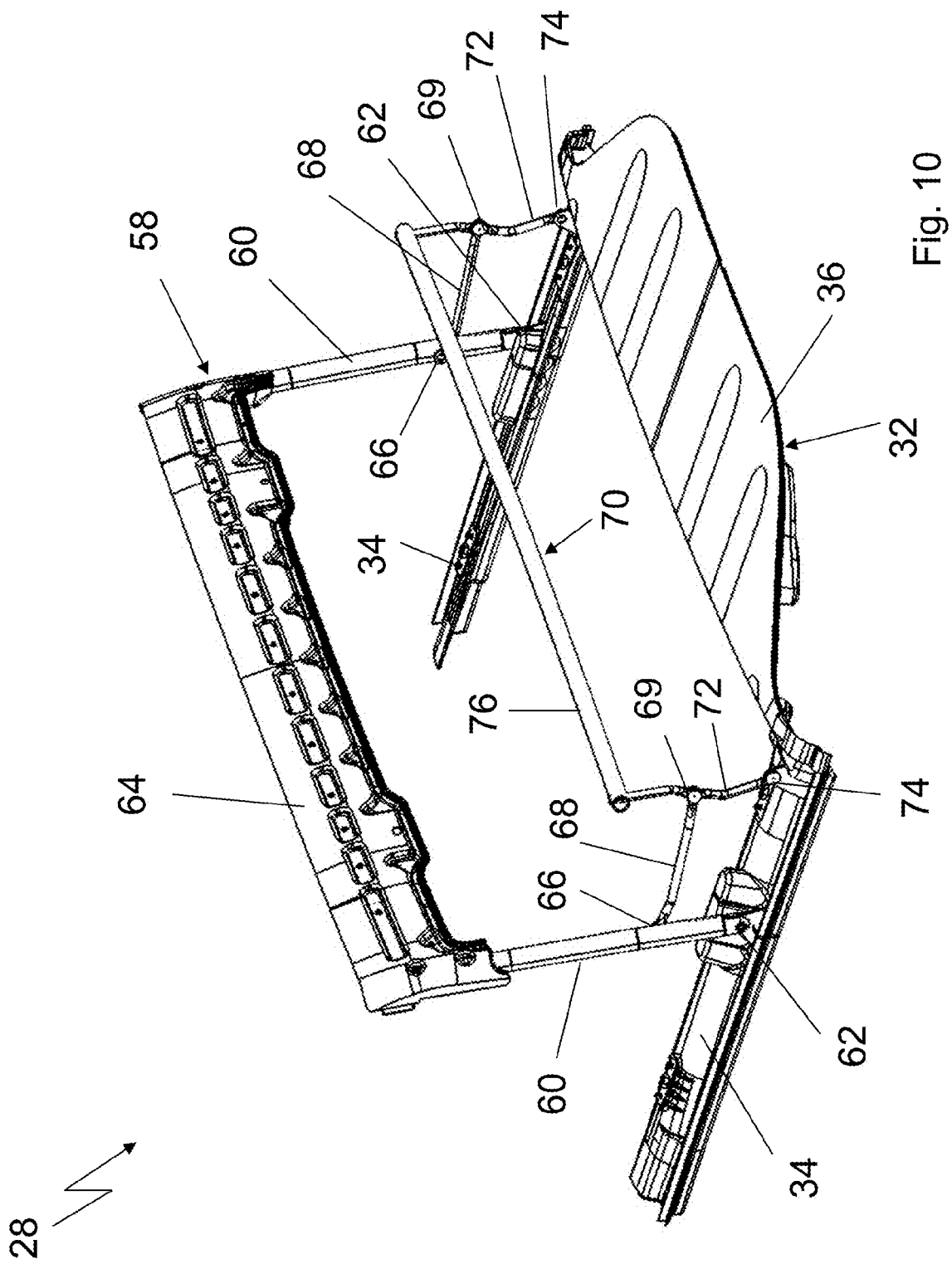
FIG. 10 shows a view of the roof opening mechanism that is similar to FIG. 9, but in the intermediate position.
Figure 11:
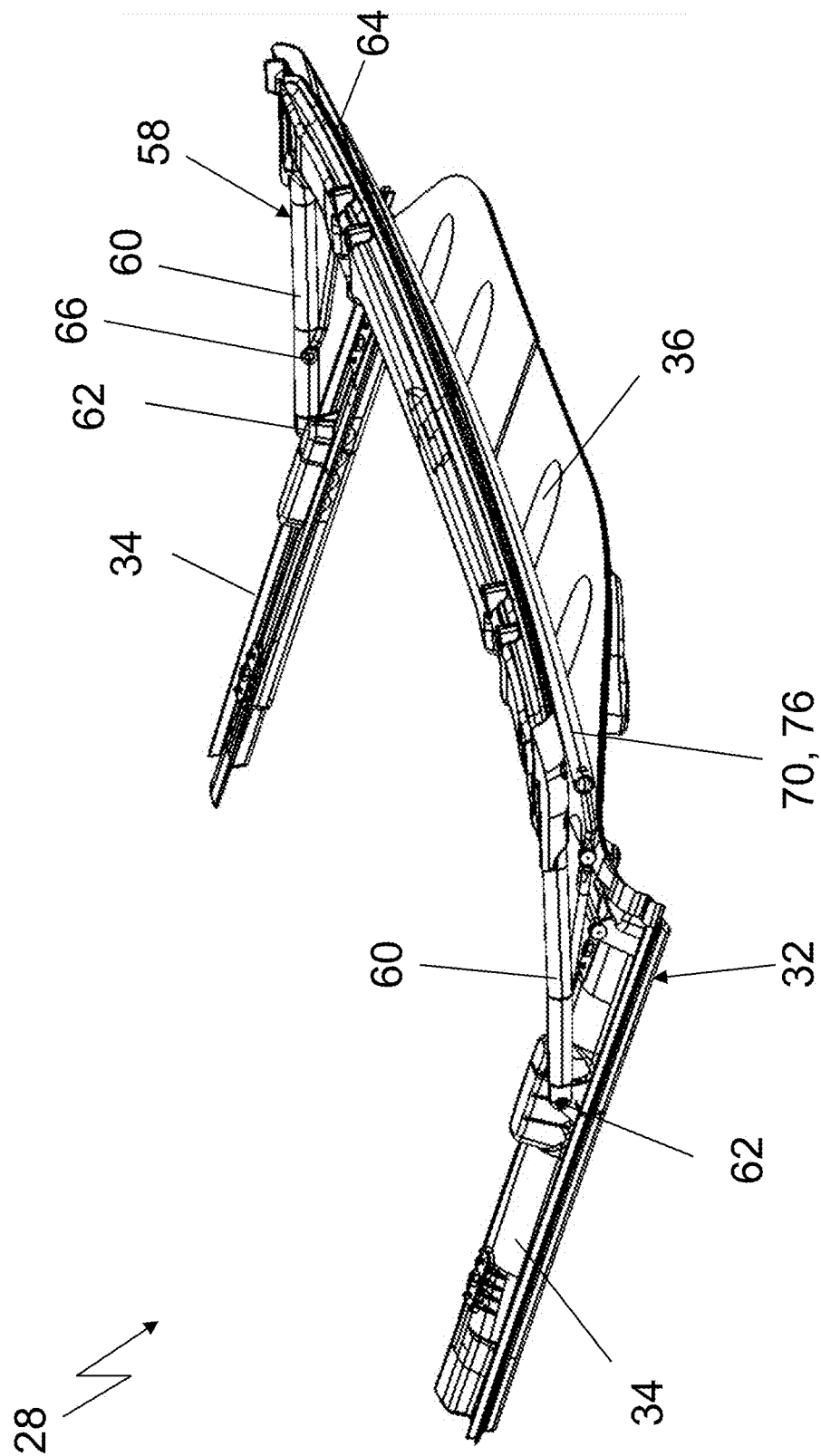
FIG. 11 equally shows a view of the roof opening mechanism that is similar to FIG. 9, but in the open position.
Figure 12:
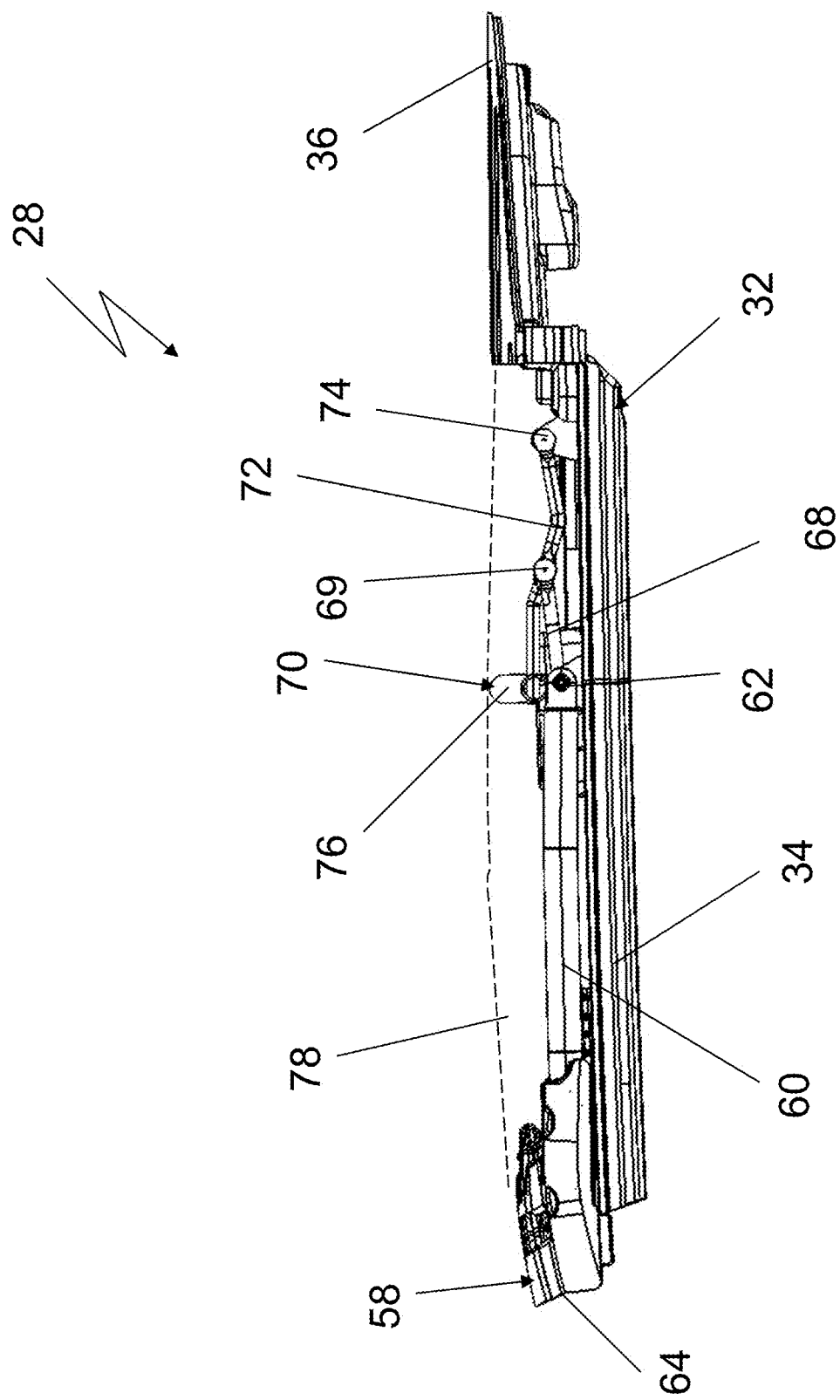
FIG. 12 shows a side view of the roof opening mechanism in the closed position thereof.
Figure 13:
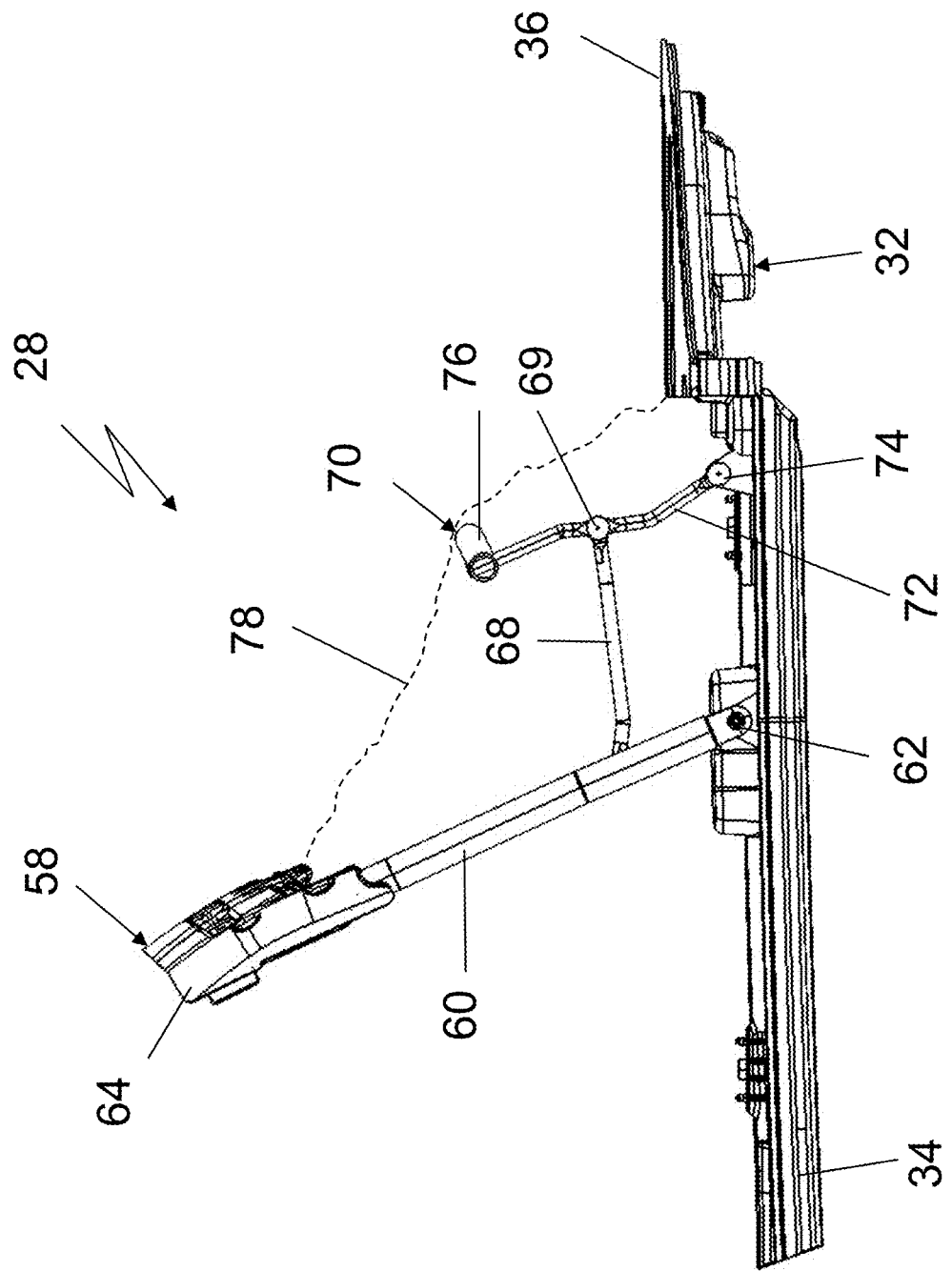
FIG. 13 shows a view of the roof opening mechanism that is similar to FIG. 12, but in the intermediate position.
Figure 14:
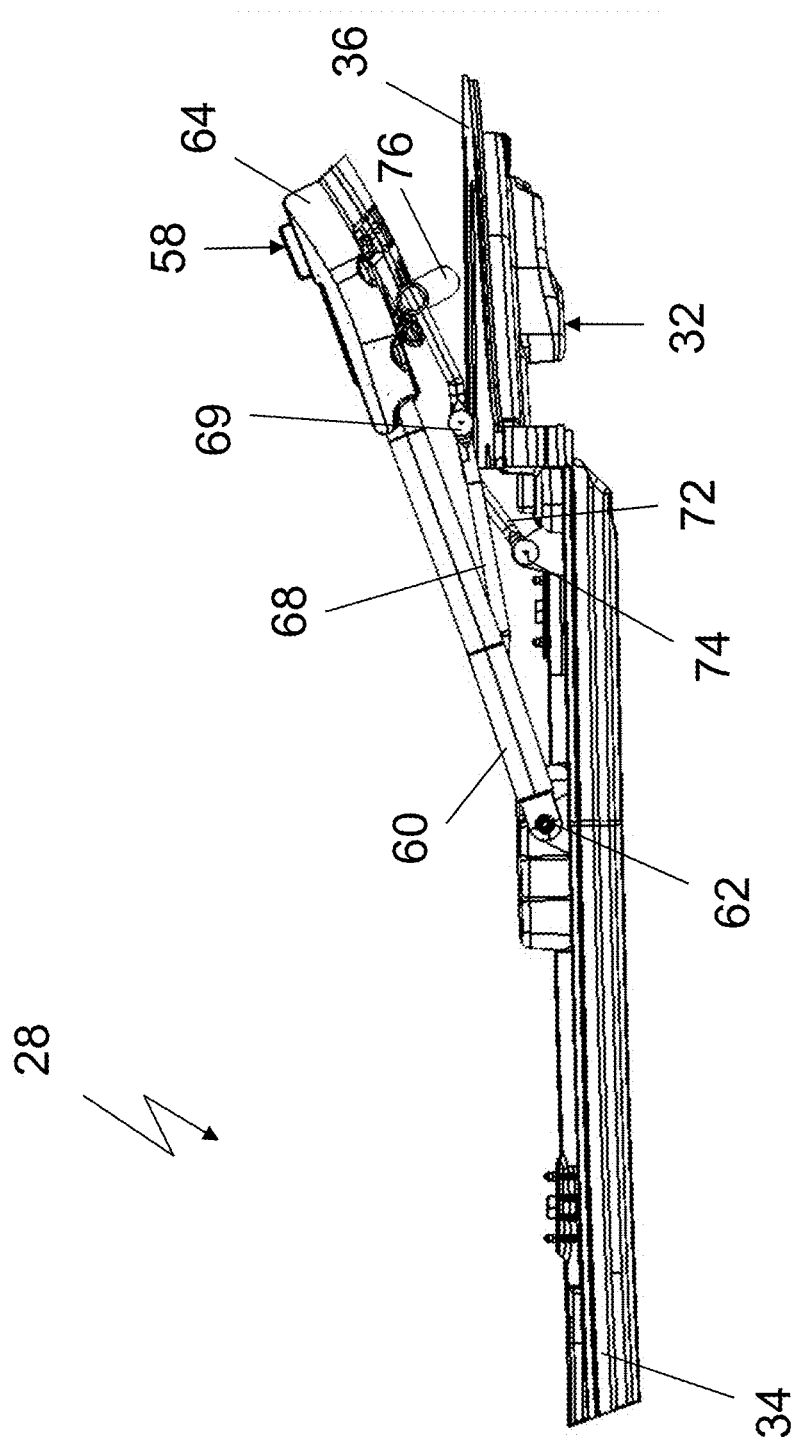
FIG. 14 shows a view of the roof opening mechanism that is similar to FIG. 13, but in the open position.
Figure 15:
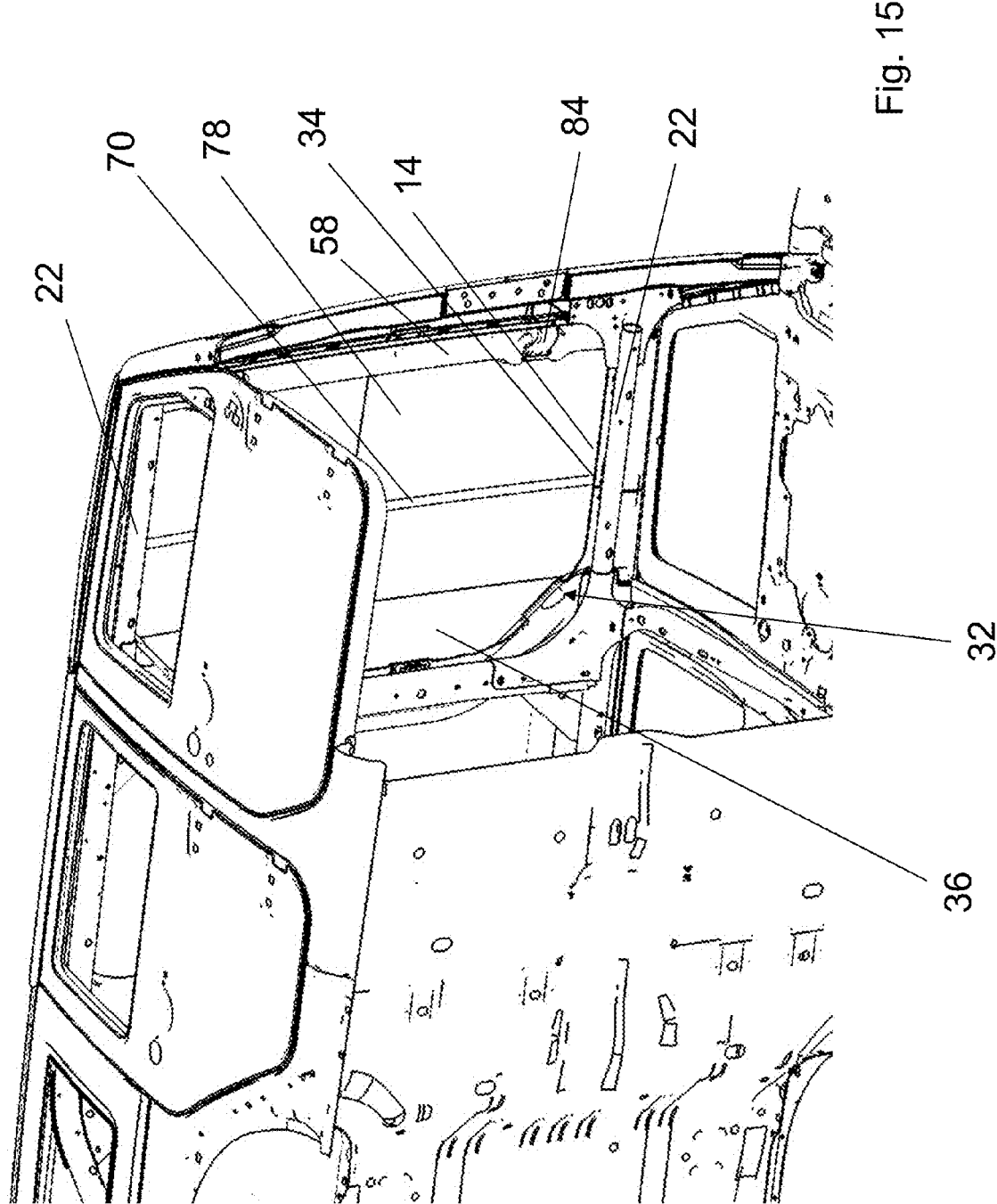
FIG. 15 shows an inside view of the vehicle structure according to FIG. 2, in the closed position of the roof opening mechanism.

In FIGS. 1 to 18, a vehicle structure 10 is illustrated, which is part of a passenger car being designed as an all-terrain vehicle and which includes a vehicle roof 12, which is provided with a roof opening 14, said roof opening being designed above a driver's seat and a front passenger seat. The roof opening 14, with its front edge, is adjacent to a front apron 16, which forms an upper frame leg of a windshield frame, said upper frame leg extending in the transverse direction of the vehicle. In the rear, the roof opening 14 is adjacent to a fixed-roof portion 18, which extends up to a rear roof edge 20. In relation to a vertical longitudinal center plane of the roof, the roof opening 14 is laterally in each instance limited by a tube-like longitudinal roof beam 22, which can be part of a rollover protection mechanism of the vehicle structure 10 and which is to be considered to be part of the roof structure here. The longitudinal roof beam 22 that is arranged on the left in relation to the forward direction of travel can be taken from FIG. 17 that is a sectional illustration. In FIGS. 1 to 7, rear elongations of the two longitudinal roof beams 22 are illustrated, which extend diagonally downwards into a rear loading space 24 of the vehicle structure 10.

In accordance with FIG. 1, the roof opening 14 is closed by a rigid roof element 26, which reaches up to the front apron 16 in the front and up to the fixed-roof portion 18 in the rear. In the edge regions being arranged on the side in relation to the vertical longitudinal center plane of the roof, the rigid roof element 26 covers the two longitudinal roof beams 22. Laterally, the rigid roof element 26, on each of its two sides, forms an upper limitation of a door cut-out 48 for a side door 50 of the vehicle structure 12.

The rigid roof element 26 is secured in its installed position being illustrated in FIG. 1 by handle screws, two of which in each instance reach through the longitudinal roof beams 22 from below and two of which reach through the rear fixed-roof portion 18 from below, said handle screws reaching into a corresponding screw thread of the rigid roof element 26 from below. In addition, the rigid roof element 26 is fixed to the front apron 16 by suitable closing lugs.

Figure 16:
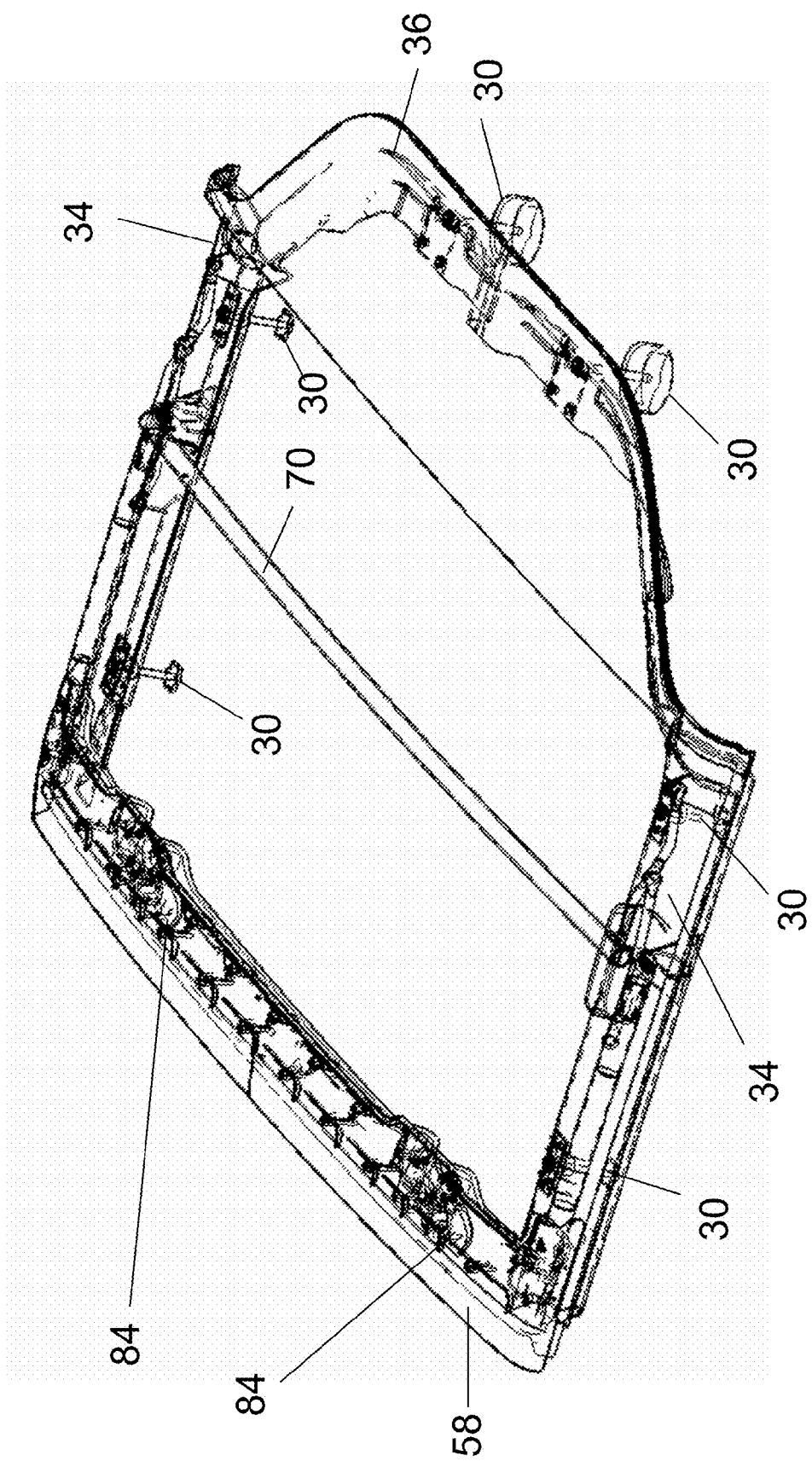
FIG. 16 shows a perspective view of a frame of the roof opening mechanism together with fixation elements.
Figure 17:
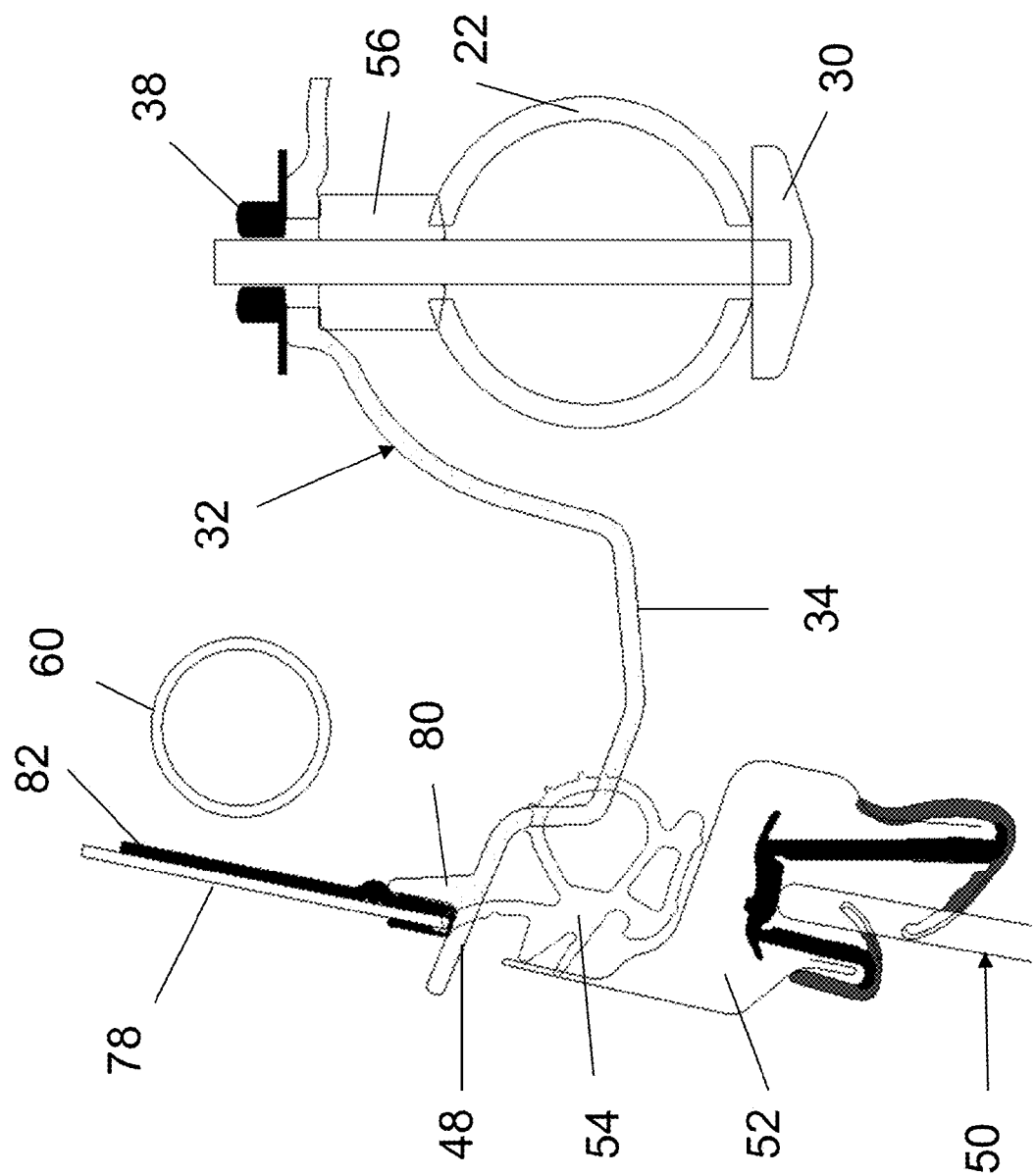
FIG. 17 shows a sectional illustration through a lateral beam of the vehicle structure according to FIG. 2, with the roof opening mechanism being installed in the region of a fixation element.
Figure 18:
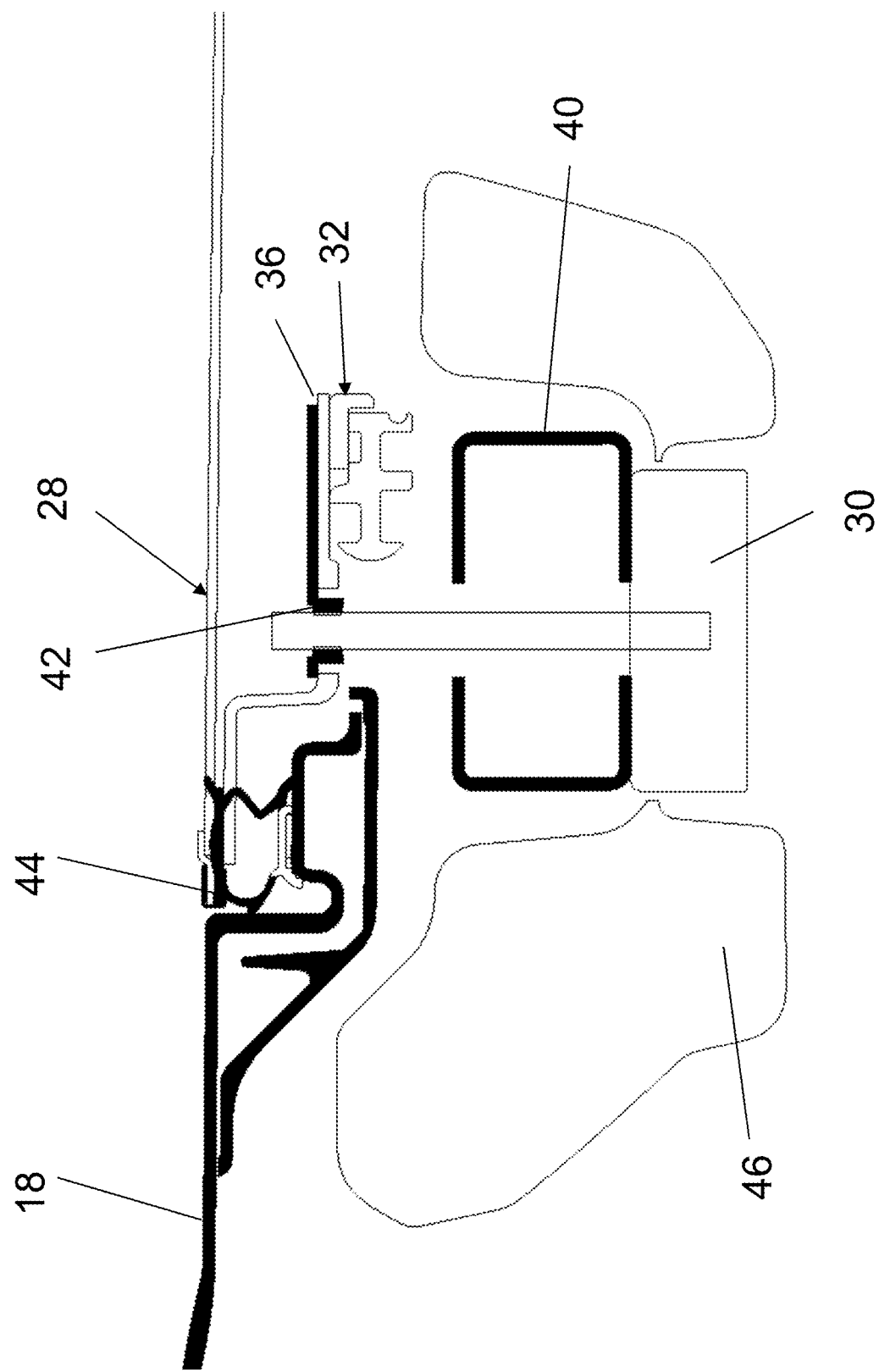
FIG. 18 shows a sectional illustration through a rear frame leg of the roof opening mechanism in the state in which it is installed on the vehicle structure.
Figure 19:
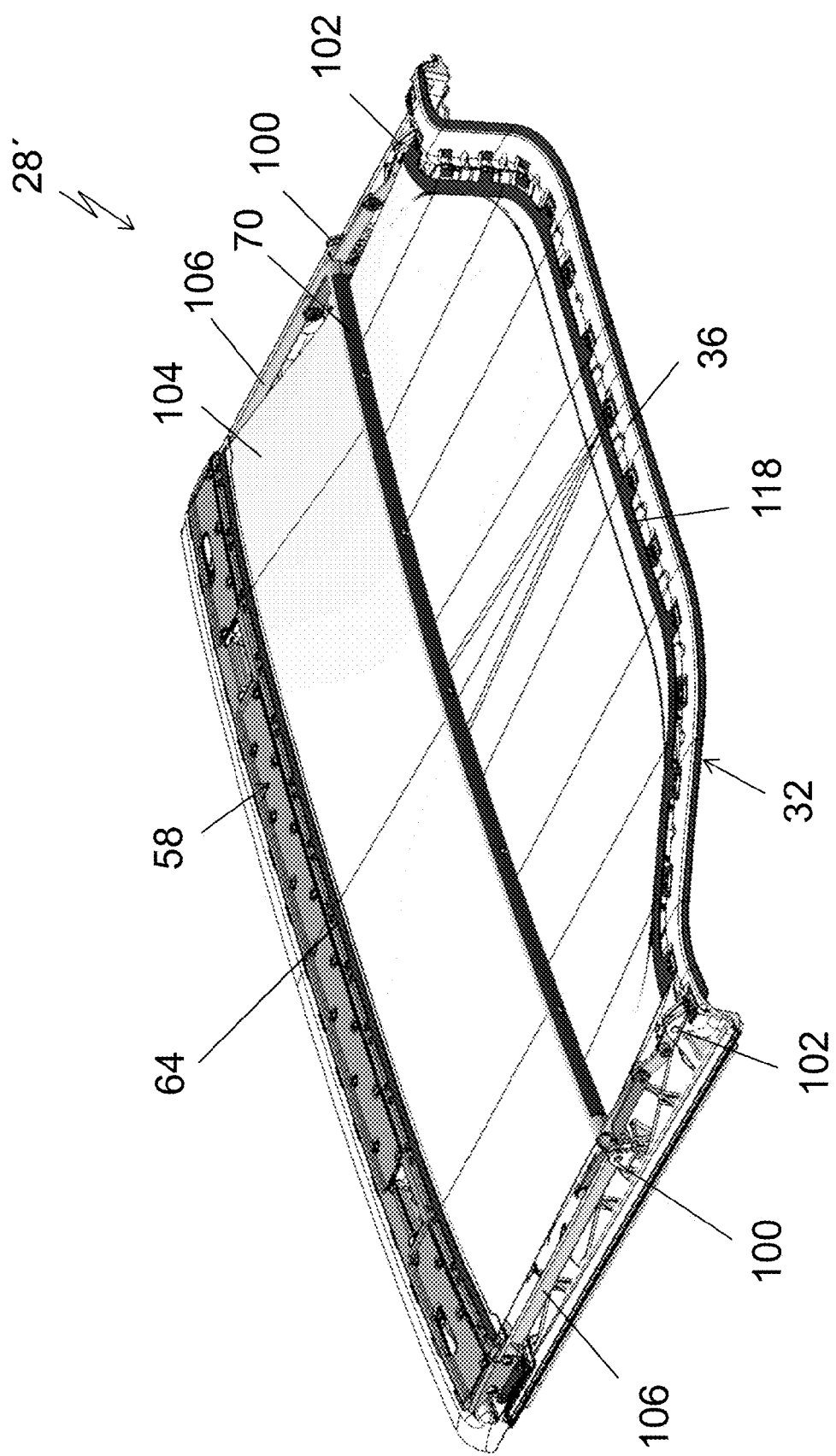
FIG. 19 shows a perspective top view of an alternative embodiment in the closed position, but without illustrating an outer shell.
Figure 20:
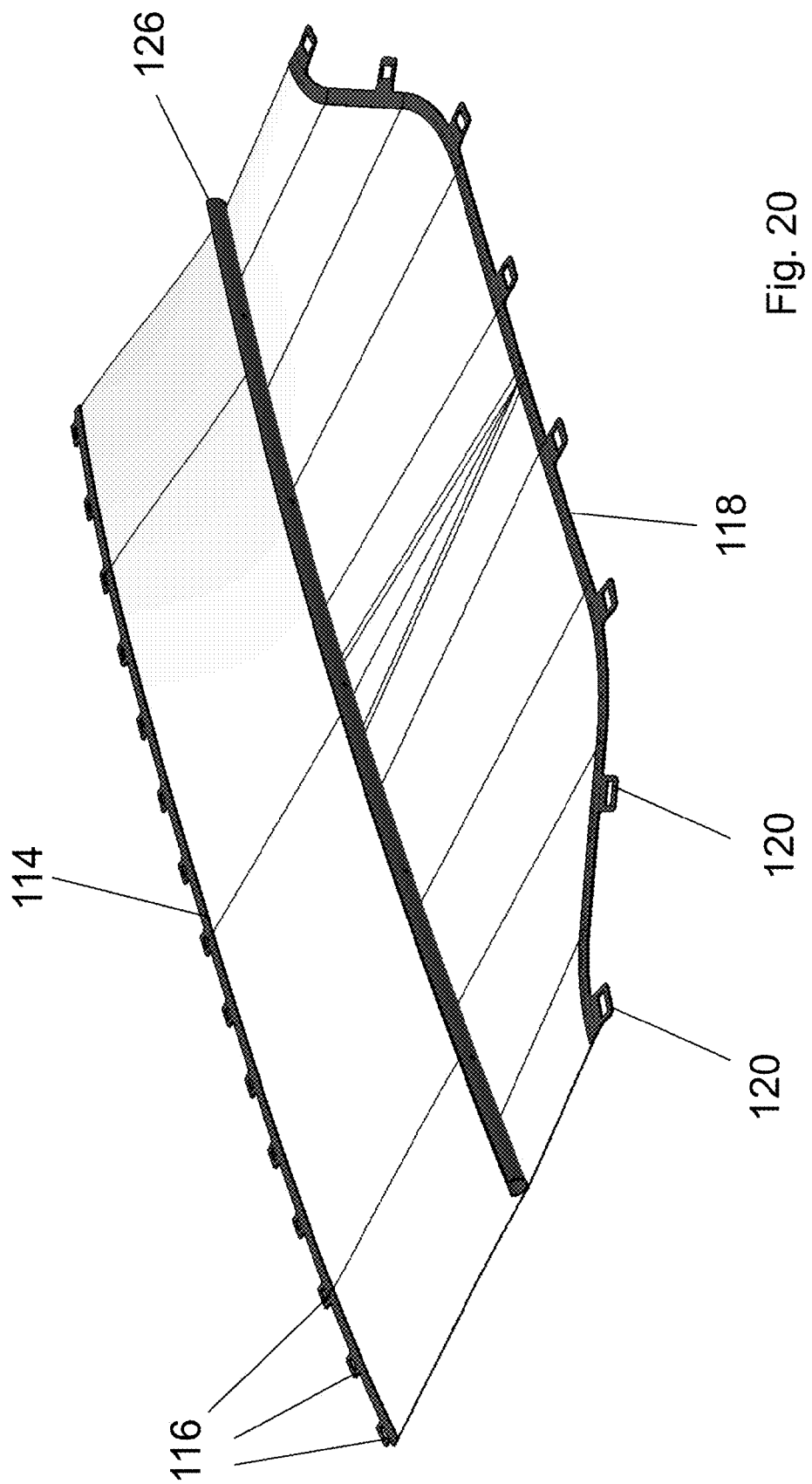
FIG. 20 shows a perspective illustration of a headlining of the roof opening mechanism according to FIG. 19.
Figure 21:
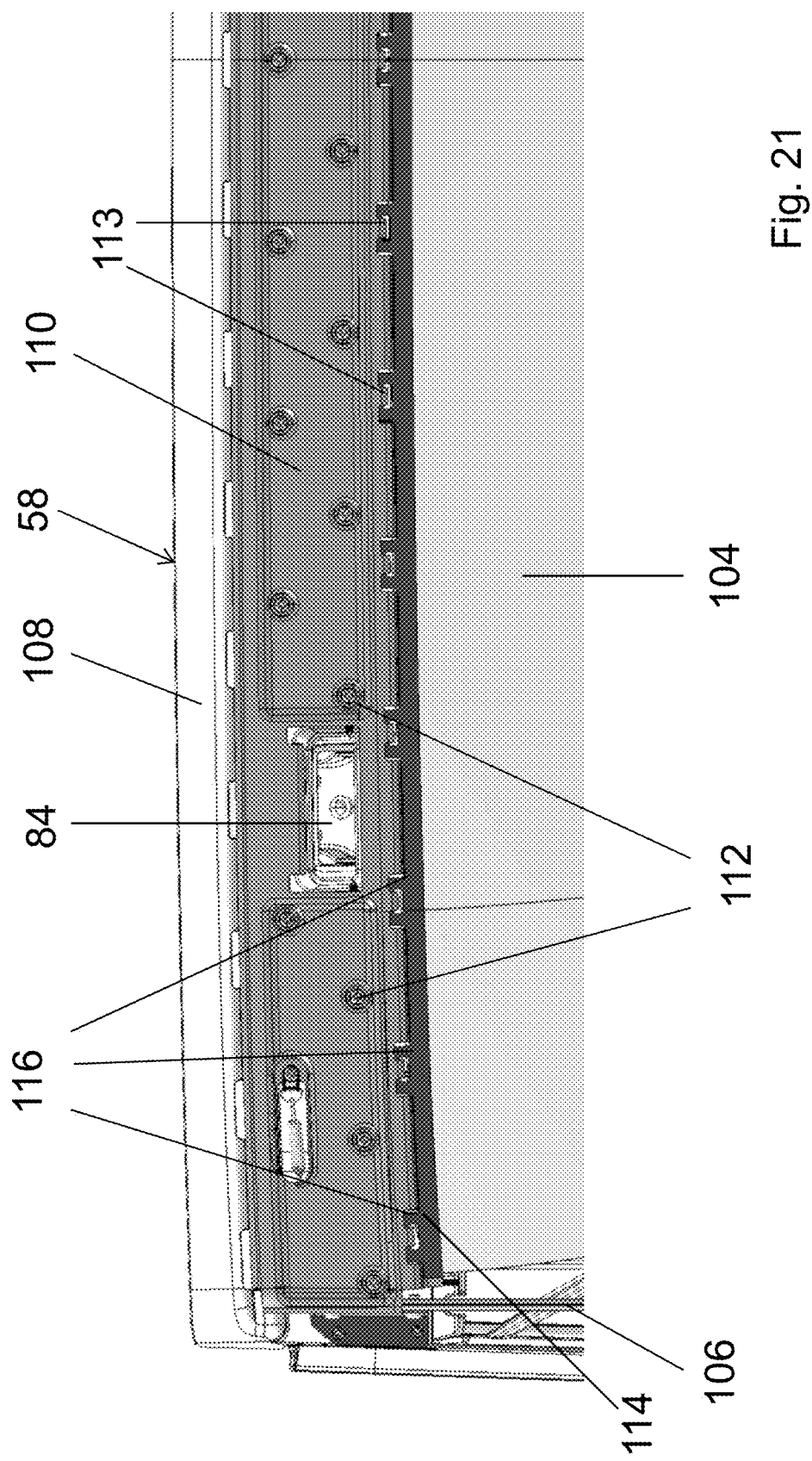
FIG. 21 shows a top view of the headlining and a main tensioning bow.
Figure 22:
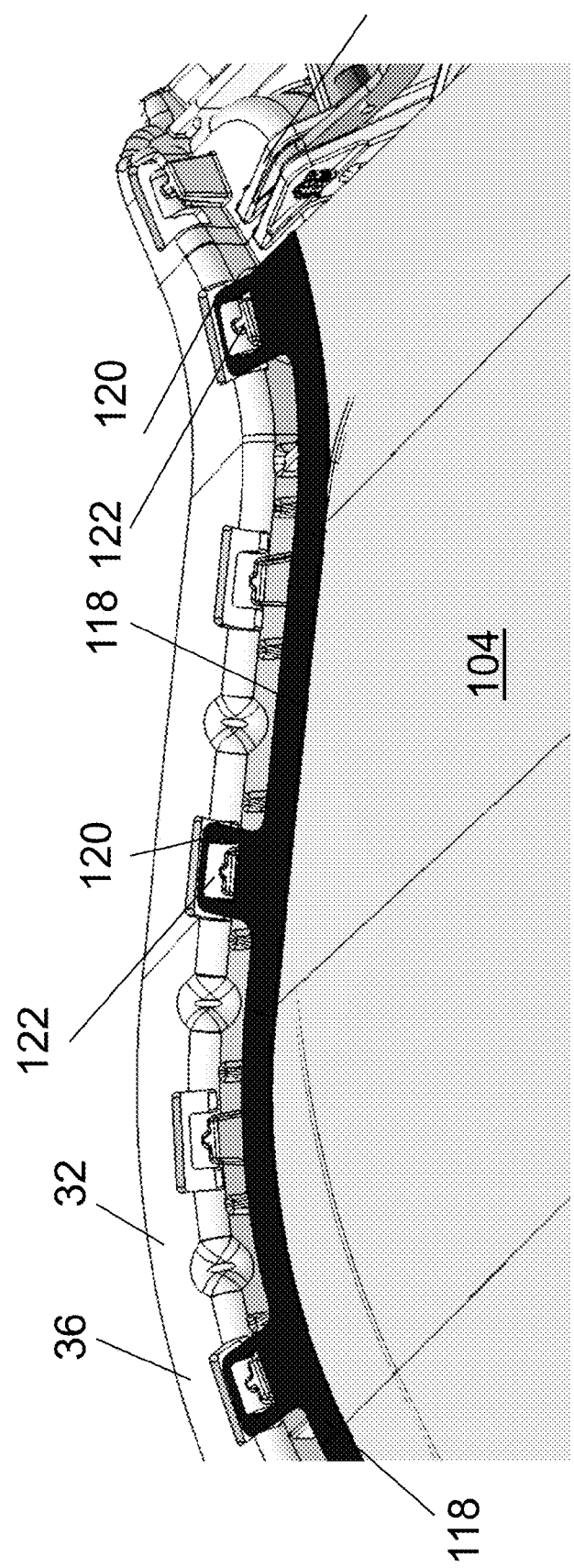
FIG. 22 shows how the headlining is linked to a base frame of the roof opening mechanism.
Figure 23:
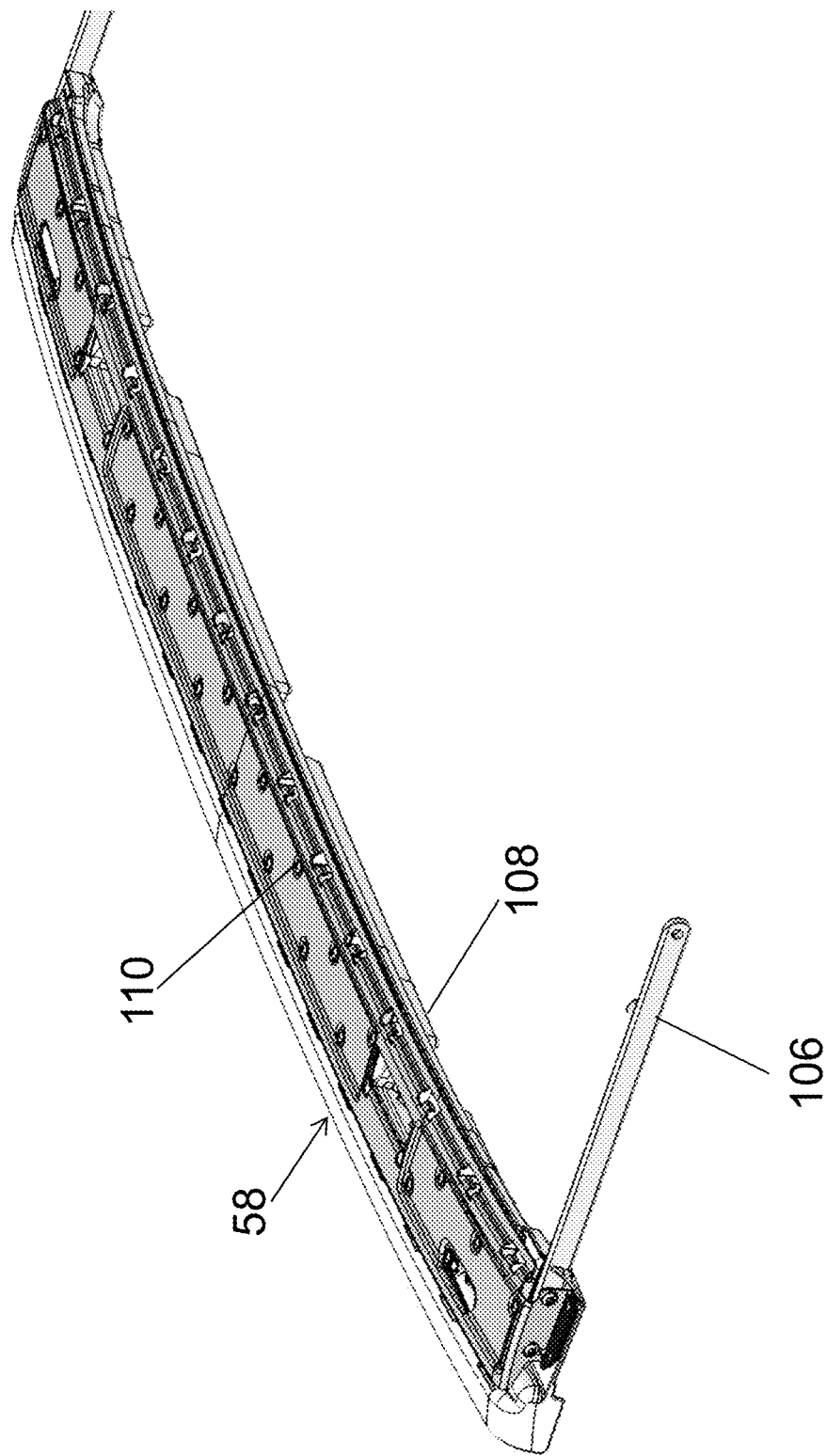
FIG. 23 shows a perspective view of the main tensioning bow on its own.
Figure 24:
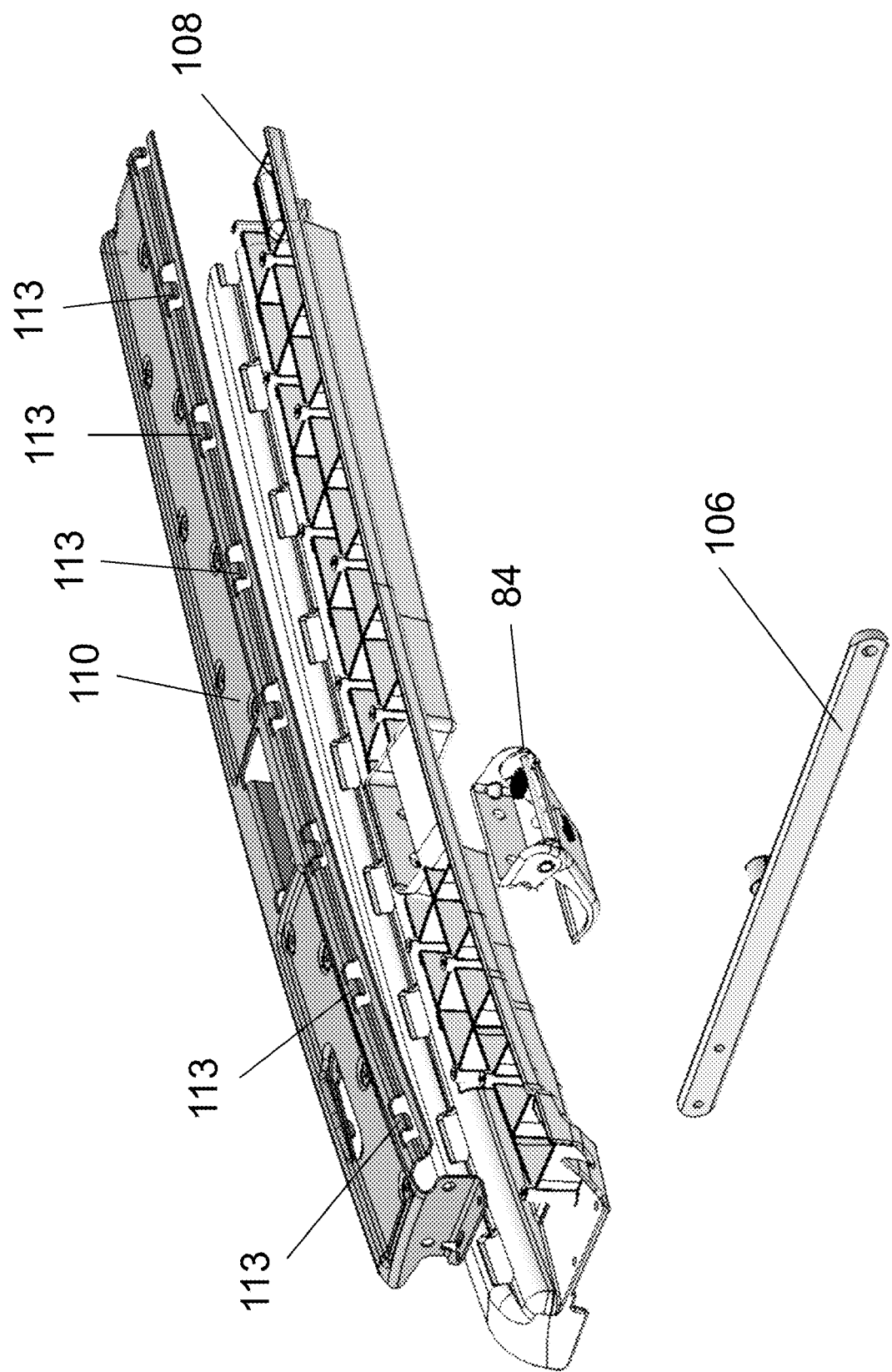
FIG. 24 shows an exploded illustration of the main tensioning bow.
Figure 25:
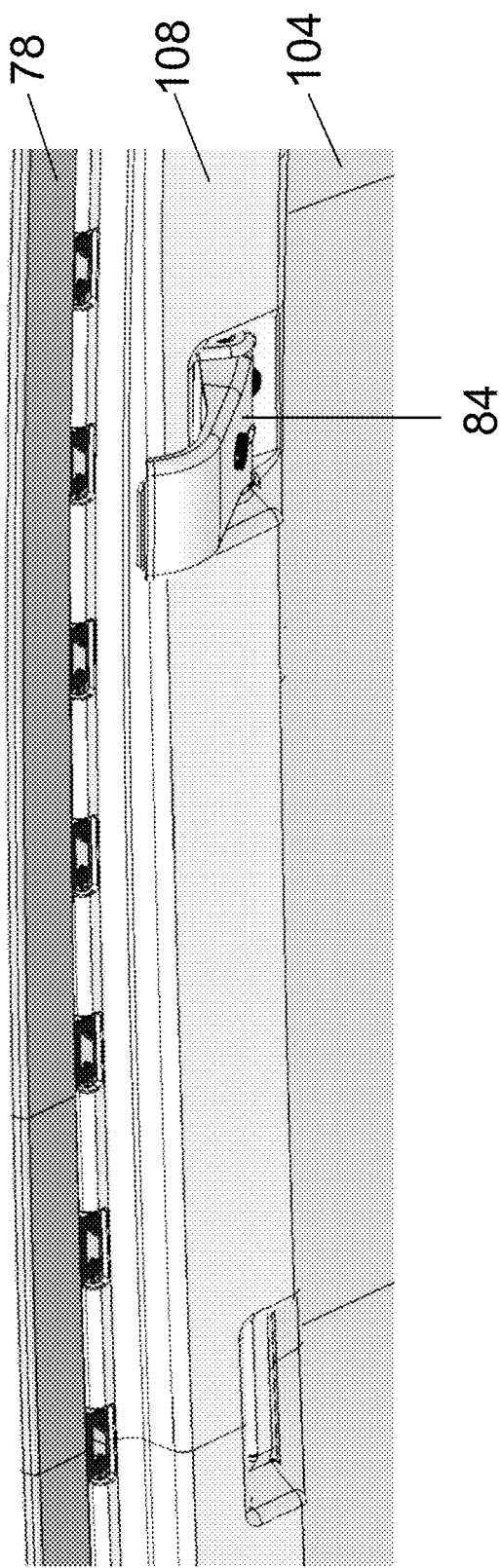
FIG. 25 shows a bottom view of the main tensioning bow.
Figure 26:
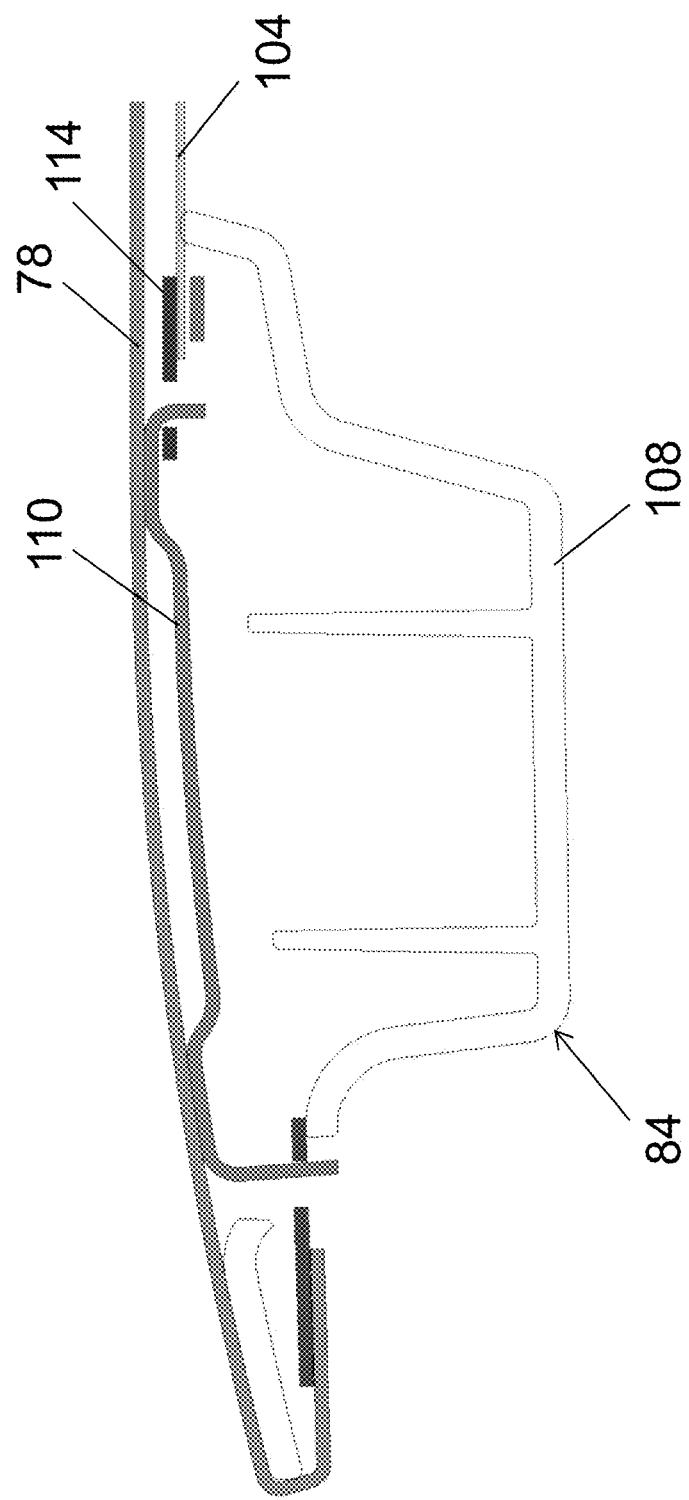
FIG. 26 shows a first section through the roof opening mechanism in the area of the main tensioning bow.
Figure 27:
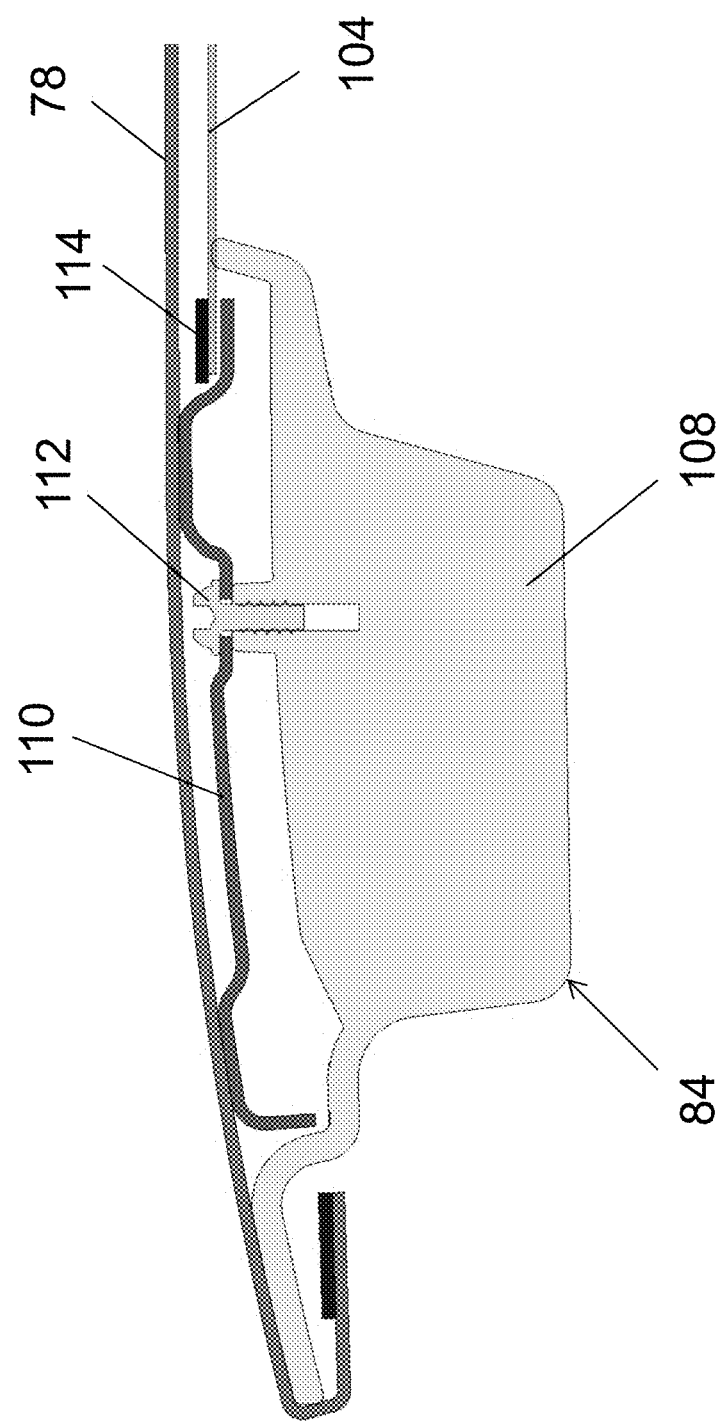
FIG. 27 shows a second section through the roof opening mechanism in the area of the main tensioning bow.
Figure 28:
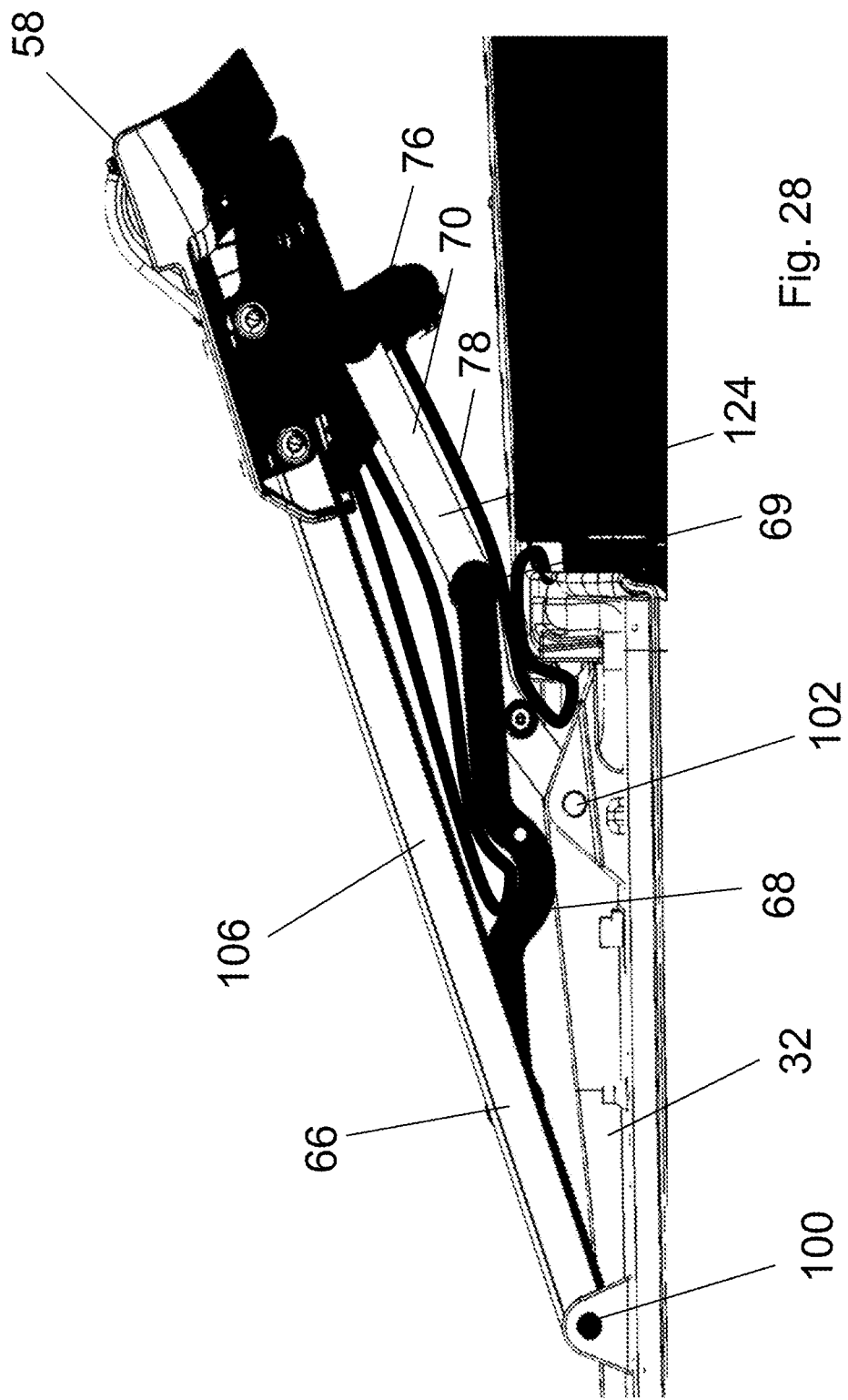
FIG. 28 shows a side view of the roof opening position in the open position and a folding of a fabric covering element.

As it can be taken from FIGS. 2 to 7, the roof opening 14 can, as an alternative to the rigid roof element 26, be provided with a roof opening mechanism 28, being designed as an interchangeable insert, which, as it can be taken from FIGS. 16 to 18, can be fixed to the roof structure by several handle screws 30. The handle screws 30 are manually unlockable fixation elements, which reach through the roof structure from below and reach into corresponding screw threads of the roof opening mechanism 28 from below. The handle screws 30 correspond to the handle screws by which the rigid roof element 26 is secured in its installed position.

As it can in particular be taken from FIGS. 9 to 14, the roof opening mechanism 28 being designed as an interchangeable insert includes a base frame 32, which has an at least nearly U-shaped layout and which consists of two longitudinal legs 34 extending in the longitudinal direction of the vehicle and of a transverse leg 36 connecting the two longitudinal legs 34 to each other at their rear ends. The longitudinal legs 34 have one free face side in the front, respectively, which face side is adjacent to the front apron 16 of the roof structure or vehicle structure 10 in the installed position being illustrated in FIGS. 2 to 7. Additionally, the longitudinal legs 34 in each instance are positioned on one of the longitudinal roof beams 22. The roof opening mechanism 28 is fixed to the roof structure via the base frame 32. This means that the base frame forms a link to the roof structure.

As it can be taken from FIGS. 16 to 18, two of the handle screws 30 previously having been mentioned also with respect to the rigid roof element 26, for fixing the roof opening mechanism to the roof structure, reach through one longitudinal roof beam 22, respectively, from below in order to then reach into a corresponding screw thread 38 from below, which screw thread is designed at the relevant longitudinal leg 34 of the base frame 32. Additionally, between the longitudinal roof beams 22 of the roof structure or vehicle structure 10 and the respective longitudinal leg of the base frame 32, in the region of the handle screws 30, one spacer 56, respectively, is arranged, the respective handle screw 30 equally reaching through said spacer.

Two further handle screws 30 reach through a transverse roof beam 40 from below, in order to then reach into a corresponding screw thread 42 from below, which screw thread is designed at the transverse leg 36 of the frame 32. Here, the transverse leg 36 rests on a seal 44, which is designed at the front edge of the fixed-roof portion 18. The handles of the handle screws 30 being accessible from the vehicle interior in the installed position can laterally be encircled by an interior paneling 46 of the roof structure. Alternatively, the base frame 32 might be fixed to the front apron and to B-pillars of the vehicle structure. Then, no longitudinal roof beams are required for fixing the base frame.

The longitudinal legs 34 of the base frame 32, which rest on the longitudinal roof beams 22, form one upper limitation, respectively, of the door cut-out 48, which can be closed by the respective side door 50 of the vehicle structure 10. The side door 50 has an upper frame piece 52, at which a seal 54 is arranged, which, in the closed position of the door 50, interacts with a corresponding sealing surface at the bottom side of the respective longitudinal leg 34 of the base frame 32.

The roof opening mechanism 28 comprises a main tensioning bow 58, which is designed so as to be substantially U-shaped and which is articulated to the longitudinal legs 34 of the base frame 32 by its free legs 60 via hinge points 62. The free legs 60 of the main tensioning bow 58, at their ends facing away from the hinge points 62, are connected to each other via a transverse leg, which, in the closed position being illustrated in FIGS. 2, 5 and 9, forms a front edge of the roof opening mechanism 28, said edge being adjacent to the front apron 16 of the vehicle structure 10. The transverse leg 64 constitutes a front bow of the roof opening mechanism 28.

The two free legs 60 of the main tensioning bow 58 are in each instance connected to a coupling link 68 via a hinge point 66, said coupling link being articulated to a U-shaped auxiliary tensioning bow 70 via a hinge point 69. The auxiliary tensioning bow 70, on each of its two sides, includes a leg 72, which is articulated in the rear end region of the respective longitudinal leg 34 of the base frame 32 via a hinge point 74. The two legs 72, at their ends facing away from the hinge points 74, are connected to each other via a transverse leg 76 constituting an intermediate bow.

The tensioning bow arrangement being formed by the main tensioning bow 58, the auxiliary tensioning bow 70 and the coupling links 68 serves for spanning a fabric covering element 78, which, in the closed position being illustrated in FIGS. 2, 5, 9, 12 and 15, spans the roof opening 14 and which, in its uncovering and open position being illustrated in FIGS. 4, 7, 11 and 14, uncovers the roof opening 14 in the region being encircled by the base frame 32. In the closed position, the main tensioning bow 58 is fixed to the front apron 16 by two closing lugs 84.

The fabric covering element 78, with its edge being arranged in the front in the longitudinal direction of the vehicle, is linked to the transverse leg 64 of the main tensioning bow 58 and is attached to the transverse leg 36 of the base frame 32 with its rear edge. As it can be taken from FIG. 17, the fabric covering element 78, in its closed position, abuts on a flange 80 of the respective longitudinal leg 34 of the base frame 32 with its edges being arranged on the side in relation to the vertical longitudinal center plane of the roof. Hereunto, at the inner side of the fabric covering element 78, a sealing layer 82 made of an elastomer material or a textile member is in each instance applied, which sealing layer abuts on the outer side of the flange 80.

FIGS. 19 to 33 illustrate a second embodiment of a roof opening mechanism 28', which is also designed as an interchangeable insert and can be fixed to a roof structure of a vehicle by means of multiple handle screws in correspondence to the embodiment according to FIGS. 1 to 18.

Figure 29:
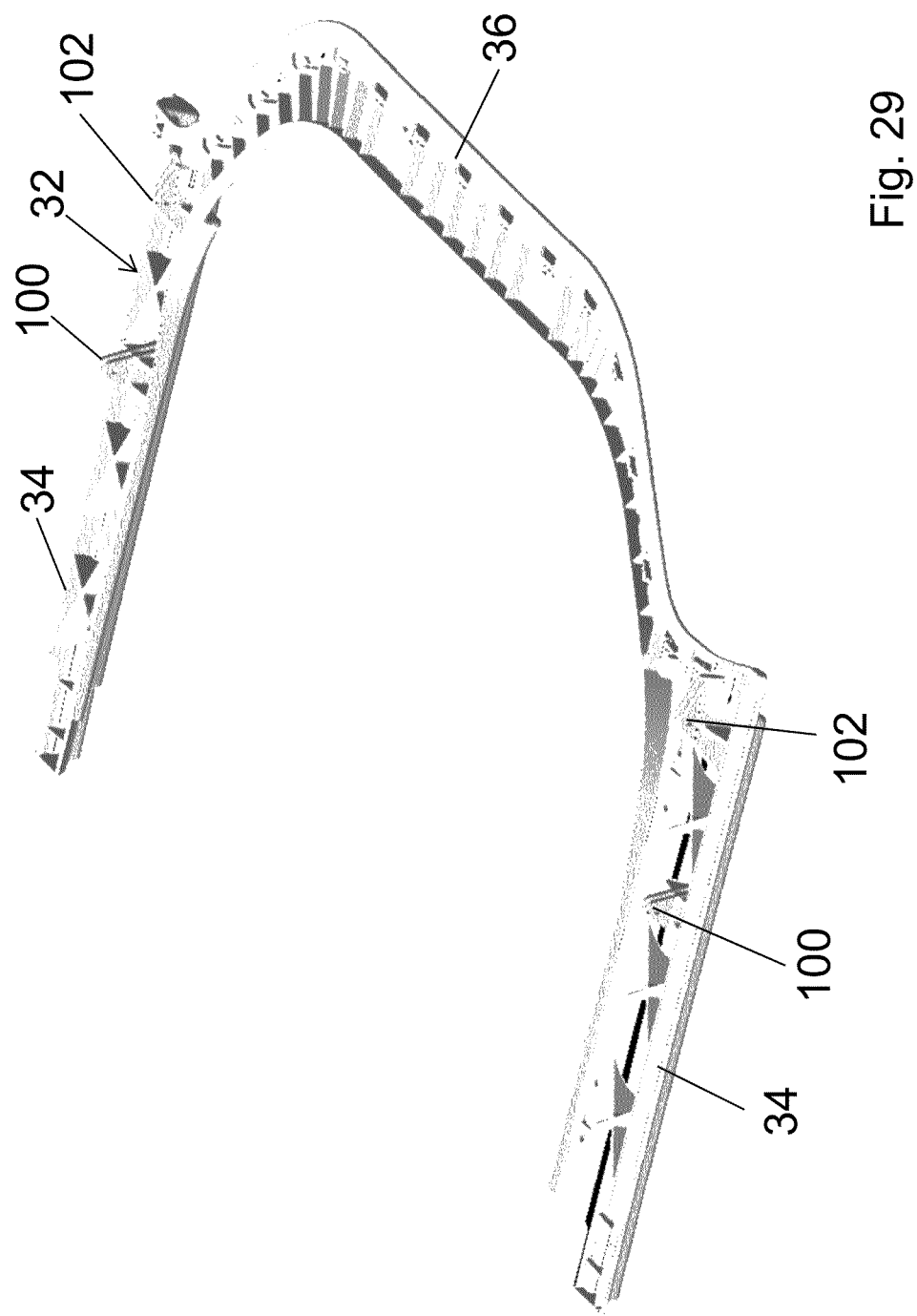
FIG. 29 shows a perspective view of a base frame of the roof opening system on its own.

The roof opening mechanism 28' designed as an interchangeable insert has a base frame 32, which is shown on its own in FIG. 29 and which is U-shaped in the top view. Thus, the base frame 32 has two longitudinal legs 34 extending in the longitudinal direction of the vehicle and a transverse leg 36 connecting the two longitudinal legs 34 at their rear ends. Each of the longitudinal legs 34 has a free face side in the front, which face side is adjacent to a front apron of the relevant roof structure in the installed position. The roof opening mechanism 28' is fixed to the vehicle structure via the base frame 32. Regarding the installed position, it is referred to the above description of the embodiment of FIGS. 1 to 18.

The base frame 32 is designed in one piece and is made of plastic, a composite material, a sheet mold compound structure, an organic sheet structure and/or a honeycomb structure. The base frame 32 can be manufactured using an injection-molding method or another type of molding method for processing a plastic material. For the purpose of stiffening, the base frame 32 has a ribbing, which can be designed as a crosswise ribbing or the like.

The base frame 32 can be provided with a graining or the like, which is produced during the manufacturing process. Thus, painting the base frame 32 is unnecessary.

In relation to a vertical longitudinal center plane of the roof, mounting sockets 100 and 102 are integrally formed on each of the two sides of the base frame 32, which mounting sockets consist of two vertical lugs, which are provided with a hole for receiving a mounting bolt. The mounting sockets 100 formed on the two longitudinal legs 34 serve to mount a main tensioning bow 58 in a pivoting manner, whereas the mounting sockets 102 serve to mount an auxiliary tensioning bow 70 in a pivoting manner. By means of the main tensioning bow 58 and the auxiliary tensioning bow 70, on the one hand, a fabric covering element 78 forming an outer shell and, on the other hand, a headlining 104 can be adjusted between a closed position (FIG. 19) covering the relevant roof opening and an open position (FIG. 28) uncovering the roof opening in correspondence to the embodiment according to FIGS. 1 to 18. Additionally, a foldable insulation (not illustrated) can be arranged between the headlining 104 and the fabric covering element 78 being an outer shell.

The main tensioning bow 58 comprises a transverse leg 64 extending in the transverse direction of the roof and being a front header, which, at each of its ends arranged on both sides, is connected to a linkage 106, which is realized as a lever and is pivotably mounted on the relevant mounting socket 100 of the base frame 32. The transverse leg 64 of the main tensioning bow 58 has a two-shell structure and comprises a trough-shaped lower shell 108, which is designed as an injection-molded part and has a ribbing for the purpose of stiffening. The lower shell 108 can also comprise a honeycomb structure with a paper honeycomb. As a second shell, the transverse leg 64 of the main tensioning bow 58 comprises an upper shell 110, which is formed from a steel sheet or an aluminum sheet and is screwed to the lower shell 108 by means of mushroom screws 112 or by means of clips. The linkages 106 are attached to the upper shell 110. At its rear edge, the upper shell 110 has hook-like lugs 113, into which the headlining 104 is hooked. For this purpose, the headlining 104 has a front strip 114, which comprises lugs 116 having recesses that are penetrated by the hook-like lugs 113 of the upper shell 110 of the transverse leg 64. The strip 114 of the headlining 104 is made of a polypropylene material and sewed to the headlining 104. Alternatively, it can also be connected to the headlining 104 using a an injection-molding method or in any other way.

At its rear edge, the headlining 104 has a rear strip 118, which is provided with hooking lugs 120 hooked into hook-like projections 122. The hook-like projections 122 are formed integrally on the base frame 32. In correspondence to the front strip 114, the rear strip 118 of the headlining 104 is made of a polypropylene material and sewed to the headlining 104. Alternatively, it can also be connected to the headlining 104 using a an injection-molding method or in any other way.

As in the embodiment according to FIGS. 1 to 18, the linkages 106, which are manufactured from a straight stamped part, are connected to a coupling link 68 via a hinge point 66, which coupling link 68 is connected to a linkage 124 of the auxiliary tensioning bow 70. The hinge point 69 is arranged in a central portion of the respective linkage 124 of the auxiliary tensioning bow 70. On one side, the linkages 124 of the auxiliary tensioning bow 70 are pivotably mounted on the relevant mounting socket 102 in the area of the respective longitudinal leg 34 of the base frame 32. On the other side, the linkages 124 are connected to each other via a transverse leg 76 of the auxiliary tensioning bow 70.

To achieve defined folding, the headlining 104 is attached to the transverse leg 76 of the auxiliary tensioning bow 70 via a shell-like attachment strip 126, and the front edge of the fabric covering element 78 is connected to the transverse leg 64 of the main tensioning bow 58, the rear edge is connected to the transverse leg 36 of the base frame 32 and a middle portion is connected to the transverse leg 76 of the auxiliary tensioning bow 70. As can be taken from FIG. 28, the fabric covering element 78 thus undergoes defined folding when being adjusted from the closed position covering the roof opening into the open position uncovering the roof opening, and it does so in such a manner that it does not protrude beyond the main tensioning bow 58 in the direction of the rear of the relevant vehicle. Instead, it is folded once between the main tensioning bow 58 and the auxiliary tensioning bow 70 and once between the auxiliary tensioning bow 70 and the base frame 32.

For being linked to the transverse leg 64 of the main tensioning bow 58 and to the transverse leg 36 of the base frame 32, the fabric covering element 78 can have a material strip at each of the corresponding edges, which strip is made of a polypropylene material and is formed in correspondence to the strips 114 and 118 of the headlining 104.

Furthermore, a closing lug 84 is attached to the transverse leg 64 of the main tensioning bow 58, via which the main tensioning bow 58 can be fixed to the front apron of the relevant vehicle. The base of the closing lug 84 is screwed to the upper shell 110 of the transverse leg 64.

As can be taken in particular from FIGS. 30 to 33, the linkages 106 and 124 of the main tensioning bow 58 and of the auxiliary tensioning bow 70 are mounted on the mounting sockets 100 and 102, respectively, via a hinge pin 130 or alternatively or additionally via bushings and clips. To ensure the distance between the respective linkage 106 of the main tensioning bow 58 and the respective coupling link 68 in the area of the hinge point 69, a bushing 130 is provided, which is welded to the linkage 106. A screw 132 reaches into the bushing 130 from the inside, which screw reaches through a corresponding mounting hole of the coupling link 68.

Additionally or alternatively, washers, stepped rivets, blind rivets and/or clips can be provided in the area of the sockets 100 and 102 or of the corresponding hinge points and in the area of the hinge points 66 and 69 so as to realize the respective hinge point in the optimal way.

To define the closed position of the linkage arrangement formed by the main tensioning bow 58, the auxiliary tensioning bow 70 and the coupling links 68, end stoppers 134 are arranged on the inner side of the coupling links 68, i.e. on the side facing toward the longitudinal center plane of the vehicle, which end stoppers 134 are made of a cushioning plastic sleeve and against which the auxiliary tensioning bow 70 rests in the closed position (cf. FIG. 31). To define the open position of the linkage arrangement, the linkages 124 of the auxiliary tensioning bow 70 each have an end stopper 136 on their inner sides in the area between the respective mounting socket 102 and the respective hinge point 69, which end stopper 136 is also formed by a screwed-on sleeve made of a cushioning material. Thus, the linkage arrangement supports itself in its end positions.

In an alternative embodiment of the roof opening mechanism of the kind described above, the linkages of the main tensioning bow and/or of the auxiliary tensioning bow can each be formed by a straight tube-like link 138, which is shown on its own in FIG. 34. The tube-like link 138 has a diameter of about 16 mm to 20 mm and exhibits high stiffness. For being articulated to the base frame, the tube-like link 138 can be provided with an inserted plastic end piece 140, which may be an injection-molded component and can be designed to have a hole to be penetrated by a hinge pin. Alternatively, hinge pins can also be integrated in one piece on the plastic end piece, which hinge pins penetrate the corresponding mounting openings of the base frame.

Another embodiment of a roof opening mechanism not illustrated, which largely corresponds to the roof opening mechanisms described above, is additionally characterized by a spring-elastic element, which facilitates operating, i.e. adjusting, the roof opening mechanism between the closed position and the open position. In the case at hand, the spring-elastic element is a torsion spring, which is supported at the base frame on the one side and at the main tensioning bow on the other side and applies pretension to the latter in the opening direction.

Another embodiment not illustrated is provided with a drive motor for operating the linkage arrangement of the roof opening mechanism. Otherwise, this embodiment, too, corresponds to the embodiments described above. The drive motor is an electric motor driving the main tensioning bow.

| List of reference numerals | |
|---|---|
| 10 | vehicle structure |
| 12 | vehicle roof |
| 14 | roof opening |
| 16 | apron |
| 18 | fixed-roof portion |
| 20 | rear roof edge |
| 22 | longitudinal roof beam |
| 24 | loading space |
| 26 | rigid element |
| 28 | roof opening mechanism |
| 30 | handle screw |
| 32 | base frame |
| 34 | longitudinal leg |
| 36 | transverse leg |
| 38 | screw thread |
| 40 | transverse roof beam |
| 42 | screw thread |
| 44 | seal |
| 46 | interior paneling |
| 48 | door cut-out |
| 50 | side door |
| 52 | frame piece |
| 54 | seal |
| 56 | spacer |
| 58 | main tensioning bow |
| 60 | free leg |
| 62 | hinge point |
| 64 | transverse leg |
| 66 | hinge point |
| 68 | coupling link |
| 69 | hinge point |
| 70 | auxiliary tensioning bow |
| 72 | free leg |
| 74 | hinge point |
| 76 | transverse leg |
| 78 | fabric covering element |
| 80 | Flange |
| 82 | sealing layer |
| 84 | closing lug |
| 100 | mounting socket |
| 102 | mounting socket |
| 104 | headlining |
| 106 | linkage |
| 108 | lower shell |
| 110 | upper shell |

| List of reference numerals | |
|---|---|
| 112 | mushroom screws |
| 113 | hook-like lugs |
| 114 | front strip |
| 116 | lug |
| 118 | rear strip |
| 120 | hooking lug |
| 122 | hook-like projection |
| 124 | linkage |
| 126 | locking strip |
| 130 | hinge pin/bushing |
| 132 | screw |
| 134 | end stopper |
| 136 | end stopper |
| 138 | tube-like link |
| 140 | plastic end piece |

The invention claimed is:

1. A vehicle roof having:
a roof structure with a roof opening, which, by a roof opening mechanism, can be closed or at least partially uncovered as desired, said roof opening mechanism being designed as an interchangeable insert,
wherein the inter-changeable insert comprises a base frame, which follows an edge of the roof opening, wherein the roof opening mechanism further comprises a fabric covering element, which, by a linkage arrangement comprising at least one tensioning bow pivotable with respect to the base frame, is displaceable between a closed position for covering the roof opening and an uncovering position for uncovering the roof opening,
wherein the base frame is at least one piece and comprises a structure and composition selected from the group consisting of a plastics material, a plastics composite material, a sheet moulding compound, organo sheets and a honey comb construction, wherein the base frame is an open frame having the shape of an U and comprising a transversal rear leg and two longitudinal side legs, and
wherein the base frame is formed in one piece with pivot sockets for the tensioning bow.

2. The vehicle roof according to claim 1, wherein the base frame comprises a rib structure.

3. The vehicle roof according to claim 1, wherein the pivot sockets each comprise two vertical flaps having a hole for a pivot pin defining a pivot axis of the tensioning bow.

4. The vehicle roof according to claim 1, wherein the base frame is attached to the roof structure via fixation elements being manually unlockable.

5. The vehicle roof according to claim 4, wherein the manually unlockable fixation elements are in each instance formed from a handle screw, which reaches through the roof structure from below.

6. The vehicle roof according to claim 1, wherein the tensioning bow, in the closed position, is adjacent to a front edge of the roof opening and is secured at the roof structure by a fastening mechanism.

7. The vehicle roof according to claim 1, wherein the tensioning bow is coupled to a pivotable auxiliary tensioning bow.

8. The vehicle roof according to claim 7, wherein the base frame integrally comprises pivot sockets for the auxiliary tensioning bow, each comprising two vertical flaps having a hole for receiving a pivot defining a pivot axis of the auxiliary tensioning bow.

9. A roof opening mechanism, being designed as an interchangeable insert, for unlockable fixation at a roof structure of a vehicle roof, and comprising a base frame, which can be placed upon an edge region of the roof structure, said edge region limiting a roof opening, further comprising a fabric covering element, which, by a linkage arrangement comprising at least one tensioning bow pivotable with respect to the base frame, is displaceable between a closed position for covering the roof opening and an uncovering position for uncovering the roof opening, wherein the base frame is at least one piece wherein the base frame is formed in one piece with the pivot sockets for the tensioning bow and has a structure and composition selected from the group consisting of a plastics material, a plastics composite material, a sheet moulding compound, organo sheets and a honey comb construction, wherein the base frame is an open frame having the shape of an U and comprising a transversal rear leg and two longitudinal side legs.

10. A vehicle roof having a roof structure with a roof opening, which, by a roof opening mechanism, can be closed or at least partially uncovered as desired, said roof opening mechanism being designed as an interchangeable insert, wherein the interchangeable insert comprises a base frame, which follows an edge of the roof opening, wherein the roof opening mechanism further comprises a fabric covering element, which, by a linkage arrangement comprising at least one tensioning bow pivotable with respect to the base frame, is displaceable between a closed position for covering the roof opening and an uncovering position for uncovering the roof opening, wherein the tensioning bow is coupled to a pivotable auxiliary tensioning bow, wherein the tensioning bow, in relation to a vertical longitudinal center plane of the roof, is on each of its two sides connected to the auxiliary tensioning bow via a coupling rod, wherein at least one end position of the linkage arrangement is defined by end stoppers attached to the linkage arrangement, and wherein the stoppers are each made of elastical element fixed to the linkage arrangement and cooperating with a linkage of the linkage arrangement.

11. The vehicle roof according to claim 10, wherein the tensioning bow comprises a transversal header element fixed on both sides to a linkage member pivotable fixed to the base frame, wherein each of the linkage members of the tensioning bow follows a straight line and is tubular.

12. A vehicle roof, having a roof structure with a roof opening, which, by a roof opening mechanism, can be closed or at least partially uncovered as desired, said roof opening mechanism being designed as an interchangeable insert, wherein the inter-changeable insert comprises a base frame, which follows an edge of the roof opening, wherein the roof opening mechanism further comprises a fabric covering element, which, by a linkage arrangement comprising at least one tensioning bow pivotable with respect to the base frame, is displaceable between a closed position for covering the roof opening and an uncovering position for uncovering the roof opening, wherein the tensioning bow is coupled to a pivotable auxiliary tensioning bow, wherein the tensioning bow, in relation to a vertical longitudinal center plane of the roof, is on each of its two sides connected to the auxiliary tensioning bow via a coupling rod, wherein at least one end position of the linkage arrangement is defined by end stoppers attached to the linkage arrangement,
wherein the tensioning bow comprises a transversal header element fixed on both sides to a linkage member pivotable fixed to the base frame, wherein each of the linkage members of the tensioning bow follows a straight line and is tubular; and
wherein the tubular linkages each comprise an end cap or end insert for connecting the respective linkage to the base frame.

13. The vehicle roof according to claim 11, wherein the auxiliary tensioning bow comprises a transversal bow member connected on both sides to a respective linkage member pivotable fixed to the base frame and the respective linkage member being tubular.

14. The vehicle roof according to claim 10, wherein bushings are fixed to the linkage arrangement for defining a pivot axis between linkages of the linkage device and a lateral distance between these linkages.

15. The vehicle roof according to claim 10, wherein the base frame is made of one piece.

16. The vehicle roof according to claim 10, wherein the base frame is an open frame having the shape of an U and comprising a transversal rear leg and two longitudinal side legs.

17. The vehicle roof according to claim 10, wherein the base frame is attached to the roof structure via fixation elements being manually unlockable.

18. The vehicle roof according to claim 10, wherein the manually unlockable fixation elements are in each instance formed from a handle screw, which reaches through the roof structure from below.

19. The vehicle roof according to claim 10, wherein the tensioning bow, in the closed position, is adjacent to a front edge of the roof opening and is secured at the roof structure by a fastening mechanism.

20. A roof opening mechanism, being designed as an interchangeable insert, for unlock-able fixation at a roof structure of a vehicle roof, and comprising a base frame, which can be placed upon an edge region of the roof structure, said edge region limiting a roof opening, further comprising a fabric covering element, which, by a linkage arrangement comprising at least one tensioning bow pivotable with respect to the base frame, is displaceable between a closed position for covering the roof opening and an uncovering position for uncovering the roof opening, wherein the tensioning bow is coupled to a pivotable auxiliary tensioning bow, wherein the tensioning bow, in relation to a vertical longitudinal center plane of the roof, is on each of its two sides connected to the auxiliary tensioning bow via a coupling rod, wherein at least one end position of the linkage arrangement is defined by end stoppers attached to the linkage arrangement, and wherein the stoppers are each made of elastical element fixed to the linkage arrangement and cooperating with a linkage of the linkage arrangement.

\* \* \* \* \*